(12) United States Patent
Bharaj et al.

(10) Patent No.: US 12,475,686 B2
(45) Date of Patent: *Nov. 18, 2025

(54) COMMON SENSE REASONING FOR DEEPFAKE DETECTION

(71) Applicant: Reality Defender, Inc., New York, NY (US)

(72) Inventors: Gaurav Bharaj, San Francisco, CA (US); Yue Zhang, East Lansing, MI (US); Ben Colman, New York, NY (US); Ali Shahriyari, Las Vegas, NV (US)

(73) Assignee: Reality Defender, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 19/094,609

(22) Filed: Mar. 28, 2025

(65) Prior Publication Data

US 2025/0225773 A1 Jul. 10, 2025

Related U.S. Application Data

(63) Continuation of application No. 18/751,168, filed on Jun. 21, 2024, now Pat. No. 12,288,379.

(Continued)

(51) Int. Cl.
*G06V 10/77* (2022.01)
*G06V 40/16* (2022.01)

(52) U.S. Cl.
CPC ........ *G06V 10/7715* (2022.01); *G06V 40/168* (2022.01)

(58) Field of Classification Search
CPC .................. G06V 10/7715; G06V 40/168
See application file for complete search history.

(56) References Cited

U.S. PATENT DOCUMENTS 12,288,379 B1 * 4/2025 Bharaj ................ G06V 40/168
2022/0058340 A1   2/2022 Aggarwal
(Continued)

OTHER PUBLICATIONS

Chang et al., "Antifakeprompt: Prompt-Tuned Visionlanguage Models Are Fake Image Detectors", Nov. 3, 2023. (Year: 2023).*

(Continued)

*Primary Examiner* — Phuoc Tran
(74) *Attorney, Agent, or Firm* — Morrison & Foerster LLP

(57) ABSTRACT

An exemplary method for detecting deepfake images and providing customized analysis comprises: receiving, from a user, a textual user inquiry regarding an image; inputting the textual inquiry and the image into a deepfake detection model, wherein the deepfake detection model comprises: an image encoder for generating a plurality of image embeddings based on the image; a text encoder for generating a plurality of textual embeddings based on the textual inquiry; one or more layers for generating a plurality of answer embeddings; and a language model for generating a textual analysis based on the plurality of answer embeddings; and outputting the textual analysis, wherein the textual analysis includes a classification result of whether the image is fake and further includes one or more visual features in the image and one or more attributes of the one or more visual features that contribute to the classification result.

21 Claims, 23 Drawing Sheets
(1 of 23 Drawing Sheet(s) Filed in Color)

Related U.S. Application Data

(60) Provisional application No. 63/600,579, filed on Nov. 17, 2023.

(56) References Cited

U.S. PATENT DOCUMENTS

| | | |
|---|---|---|
| 2023/0153599 A1 | 5/2023 | Dalli |
| 2023/0154188 A1 | 5/2023 | Li |
| 2023/0401824 A1 | 12/2023 | Khan |
| 2024/0291779 A1* | 8/2024 | Catalano ............... H04L 51/52 |

OTHER PUBLICATIONS

Sun et al., "Towards General Visual-Linguistic Face Forgery Detection", Jul. 31, 2023. (Year: 2023).*

Agrawal et al. "nocaps: novel object captioning at scale." IEEE/CVF International Conference on Computer Vision, Oct. 27-Nov. 2, 2019, Seoul, Korea; pp. 1-23.

Agrawal et al. "VQA: Visual Question Answering," IEEE International Conference on Computer Vision (ICCV), Dec. 7-13, 2015, Santiago, Chile; pp. 1-25.

Alayrac et al. "Flamingo: a Visual Language Model for Few-Shot Learning," NeurIPS 2022: 36th Conference on Neural Information Processing Systems, Nov. 28-Dec. 9, 2022, New Orleans, Louisiana; pp. 1-54.

Anderson et al. "SPICE: Semantic Propositional Image CaptionEvaluation," Computer Vision—ECCV 2016: 14th European Conference, Oct. 11-14, 2016, Amsterdam, The Netherlands; pp. 1-17.

Anderson et al. "Vision-and-Language Navigation: Interpreting visually-grounded navigation instructions in real environments," IEEE/CVF Conference on Computer Vision and Pattern Recognition (CVPR) Jun. 18-23, 2018, Salt Lake City, Utah; 13 pages.

Bai et al. "AUNet: Learning Relations Between Action Units for Face Forgery Detection," IEEE/CVF Conference on Computer Vision and Pattern Recognition, Jun. 18-22, 2023, Vancouver, BC, Canada; pp. 24709-24719.

Bharaj et al., U.S. Office Action dated Nov. 7, 2024, directed to U.S. Appl. No. 18/751,168; 11 pages.

C. Lin. "ROUGE: A Package for Automatic Evaluation of Summaries," Workshop on Text Summarization Branches Out, Jul. 25-26, 2004, Barcelona, Spain; 24 pages.

Chang et al. (Nov. 2023). "AntifakePrompt: Prompt-Tuned Vision-Language Models are Fake Image Detectors," located at https://arxiv.org/abs/2310.17419; pp. 1-24.

Coccomini et al. "Combining EfficientNet and Vision Transformers for Video Deepfake Detection," International Conference on Image Analysis and Processing, May 23-27, 2022, Lecce, Italy; pp. 1-11.

Dai et al. (Jun. 2023). "InstructBLIP: Towards General-purpose Vision-Language Models with Instruction Tuning," located at https://arxiv.org/abs/2305.06500; pp. 1-17.

Denkowski et al. "Meteor Universal: Language Specific Translation Evaluation for Any Target Language," Ninth Workshop on Statistical Machine Translation, Jun. 26-27, 2014, Baltimore, Maryland; pp. 376-380.

Devlin et al. (Oct. 2018). "BERT: Pre-training of Deep Bidirectional Transformers for Language Understanding," located at https://arxiv.org/abs/1810.04805; 16 pages.

Dolhansky et al. (Oct. 2020). "The DeepFake Detection Challenge (DFDC) Dataset," located at https://arxiv.org/abs/2006.07397; pp. 1-13.

Dosovitskiy et al. (Oct. 2020). "An Image is Worth 16x16 Words: Transformers for Image Recognition at Scale," located at https://arxiv.org/abs/2010.11929; pp. 1-22.

Draelos et al. (Nov. 2020). "Use HiResCAM instead of Grad-CAM for faithful explanations of convolutional neural networks," located at https://arxiv.org/abs/2011.08891; pp. 1-20.

F. Chollet. "Xception: Deep Learning with Depthwise Separable Convolutions," IEEE Conference on Computer Vision and Pattern Recognition (CVPR), Jul. 21-26, 2017, Honolulu, Hawaii; pp. 1251-1258.

Goodfellow et al. (Jun. 2014). "Generative Adversarial Nets," Communications of the ACM 63(11); pp. 1-9.

Goyal et al. "Making the V in VQA Matter: Elevating the Role of Image Understanding in Visual Question Answering," IEEE Conference on Computer Vision and Pattern Recognition (CVPR), Jul. 21-26, 2017, Honolulu, Hawaii; pp. 1-11.

Guo et al. "Controllable Guide-Space for Generalizable Face Forgery Detection," IEEE/CVF International Conference on Computer Vision, Oct. 1-6, 2023, Paris, France; pp. 1-13.

Gupta et al. "Visual Programming: Compositional visual reasoning without training," IEEE/CVF Conference on Computer Vision and Pattern Recognition (CVPR), Jun. 17-24, 2023, Vancouver, BC, Canada; 13 pages.

Ho et al. (Jun. 2020) "Denoising Diffusion Probabilistic Models," Advances in neural information processing systems 33; pp. 1-25.

Hong et al. "VLN BERT: A Recurrent Vision-and-Language BERT for Navigation," IEEE/CVF conference on Computer Vision and Pattern Recognition, Jun. 20-25, 2021, Nashville, Tennessee; pp. 1-18.

Karras et al. "Analyzing and Improving the Image Quality of StyleGAN," IEEE/CVF Conference on Computer Vision and Pattern Recognition (CVPR), Jun. 13-19, 2020, Seattle, Washington; pp. 1-21.

Lake et al. (2017). "Building Machines That Learn and Think Like People," Behavioral and Brain Sciences 40; pp. 1-58.

Li et al. "Celeb-DF: A Large-scale Challenging Dataset for DeepFake Forensics," IEEE/CVF Conference on Computer Vision and Pattern Recognition (CVPR), Jun. 13-19, 2020, Seattle, Washington; 10 pages.

Li et al. "Face X-ray for More General Face Forgery Detection," IEEE/CVF Conference on Computer Vision and Pattern Recognition (CVPR), Jun. 13-19, 2020, Seattle, Washington; 10 pages.

Li et al. (Jun. 2023). "BLIP-2: Bootstrapping Language-Image Pre-training with Frozen Image Encoders and Large Language Models," located at https://arxiv.org/abs/2301.12597; 13 pages.

Mirsky et al. (Jan. 2020). "The Creation and Detection of Deepfakes: A Survey," ACM Computing Surveys 1(1); pp. 1:1-1:38.

Oord et al. (Jul. 2018). "Representation Learning with Contrastive Predictive Coding," located at https://arxiv.org/abs/1807.03748; pp. 1-13.

Papineni et al. "BLEU: a Method for Automatic Evaluation of Machine Translation," 40th Annual Meeting on Association for Computational Linguistics, Jul. 7-12, 2002, Philadelphia, Pennsylvania; 8 pages.

Ramesh et al. (Apr. 2022). "Hierarchical Text-Conditional Image Generation with CLIP Latents," located at https://arxiv.org/abs/2204.06125; pp. 1-27.

Ricker et al. (Oct. 2022). "Towards the Detection of Diffusion Model Deepfakes," located at https://arxiv.org/abs/2210.14571; 31 pages.

Rossler et al. "FaceForensics++: Learning to Detect Manipulated Facial Images," IEEE/CVF International Conference on Computer Vision Workshop (ICCVW), Oct. 27-28, 2019, Seoul, Korea; pp. 1-11.

Saharia et al. (May 2022). "Photorealistic Text-to-Image Diffusion Models with Deep Language Understanding," Advances in Neural Information Processing Systems 35; pp. 1-46.

Schwenk et al. "A-OKVQA: A Benchmark for Visual Question Answering using World Knowledge," European Conference on Computer Vision, Oct. 23-27, 2022, Tel Aviv, Israel; pp. 1-20.

Selvaraju et al. "Grad-CAM: Visual Explanations from Deep Networks via Gradient-based Localization," IEEE International Conference on Computer Vision (ICCV), Oct. 22-29, 2017, Venice, Italy; pp. 1-23.

Shiohara et al. "Detecting Deepfakes with Self-Blended Images," IEEE/CVF Conference on Computer Vision and Pattern Recognition, Jun. 18-24, 2022, New Orleans, Louisiana; pp. 1-11.

Sun et al. (Jul. 2023). "Towards General Visual-Linguistic Face Forgery Detection," located at https://arxiv.org/abs/2307.16545; 16 pages.

T. Geller, (Jul. 2008). "Overcoming the Uncanny Valley," IEEE Computer Graphics and Applications 28(4); pp. 11-17.

(56) References Cited

OTHER PUBLICATIONS

Tan et al. "EfficientNet: Rethinking Model Scaling for Convolutional Neural Networks," International Conference on Machine Learning, Jun. 9-15, 2019, Long Beach, California; 11 pages.

Tolosana et al. (Jan. 2020). "DeepFakes and Beyond: A Survey of Face Manipulation and Fake Detection," Information Fusion 64; pp. 1-23.

Trinh et al. (Jun. 2018). "A Simple Method for Commonsense Reasoning," located at https://arxiv.org/abs/1806.02847; pp. 1-12.

Turton et al. (Jan. 2020). "How Deepfakes Make Disinformation More Real Than Ever: QuickTake," Bloomberg Industry Group, Inc.; pp. 1-3.

Vaccari et al. (Jan. 2020). "Deepfakes and Disinformation: Exploring the Impact of Synthetic Political Video on Deception, Uncertainty, and Trust in News," Social Media+ Society 6(1); pp. 1-13.

Vedantam et al. "CIDEr: Consensus-based Image Description Evaluation," IEEE Conference on Computer Vision and Pattern Recognition (CVPR), Jun. 7-12, 2015, Boston, Massachusetts; pp. 1-17.

Vinyals et al. (Sep. 2016). "Show and Tell: Lessons learned from the 2015 MSCOCO Image Captioning Challenge," IEEE Transaction on Pattern Analysis and Machine Intelligence; pp. 1-12.

Zhu et al. (Apr. 2023). "MiniGPT-4: Enhancing Vision-Language Understanding with Advanced Large Language Models," located at https://arxiv.org/abs/2304.10592; pp. 1-15.

Zhuang et al. "UIA-ViT: Unsupervised Inconsistency-Aware Method based on Vision Transformer for Face Forgery Detection," European Conference on Computer Vision (ECCV 2022), Oct. 23-27, 2022, Tel Aviv, Israel; pp. 1-16.

International Search Report and Written Opinion mailed Dec. 27, 2024, directed to International Application No. PCT/US2024/056145; 9 pages.

\* cited by examiner

202
Receiving, from a user, a textual user inquiry regarding an image

204
Inputting the textual inquiry and the image into a deepfake detection model, wherein the deepfake detection model comprises:

an image encoder for generating a plurality of image embeddings based on the image;

a text encoder for generating a plurality of textual embeddings based on the textual inquiry;

one or more layers for generating a plurality of answer embeddings based on the plurality of image embeddings and the plurality of textual embeddings; and a language model for generating a textual analysis based on the plurality of answer embeddings

206
Outputting the textual analysis, wherein the textual analysis includes a classification result of whether the image is fake and further includes one or more visual features in the image and one or more attributes of the one or more visual features that contribute to the classification result

FIG. 4

| # | Facial Features | Fake | Real |
|---|---|---|---|
| 1 | Eyebrows | overlapping, broken, blurred, etc. | arched, straight, thick, thin, bushy, sparse, etc. |
| 2 | Skin | boundaries, stain, flaws, inconsistent color, etc. | smooth, illuminated, wrinkled, even, etc. |
| 3 | Eyes | overly large, small, blurred, too rigid, etc. | round, oval, deep, large, small, sparking, etc. |
| 4 | Nose | unnaturally curved, lack of details, no nose, etc. | straight, pointed, broad, etc. |
| 5 | Mouth/Teeth/Chin | overly large, small mouth, unnatural color for mouth, teeth, overly pointed, square chin, etc. | full, thin, pouty mouth, white/aligned/misaligned teeth, overly squared/ pointed chins, etc. |
| 6 | Others | mismatched bangs/ fringe/mustache/beard, blurry eyeglasses frame, inconsistent/unrealistic shadow, etc. | complete face feature, proper hair/bangs/hairstyle, matched mustache/beard, etc. |

FIG. 5

| # | Method | DD-VQA Deepfake Detection | | | | DD-VQA Answer Generation | | | | |
|---|---|---|---|---|---|---|---|---|---|---|
| | | Acc ↑ | Recall ↑ | Precision ↑ | F1 ↑ | BLUE-4 ↑ | CIDEr ↑ | ROUGE_L ↑ | METEOR ↑ | SPICE ↑ |
| 1 | BLIP [23] (baseline) | 0.8168 | 0.9596 | 0.7861 | 0.8642 | 0.3569 | 1.8177 | 0.5664 | 0.3301 | 0.6658 |
| 2 | BLIP-T (ours) | 0.8365 | 0.9489 | 0.8131 | 0.8758 | 0.3714 | 1.8715 | 0.5774 | 0.3349 | 0.6710 |
| 3 | BLIP-I (ours) | 0.8487 | 0.9448 | 0.8298 | 0.8836 | 0.3800 | 1.8931 | 0.5882 | 0.3419 | 0.6788 |
| 4 | BLIP-TI (ours) | 0.8749 | 0.9341 | 0.8697 | 0.9007 | 0.4075 | 2.0567 | 0.6085 | 0.3463 | 0.6915 |

FIG. 6

| # | Methods | Multi-modal Enhancement | Intra-testing FP++ (c40) ACC↑ | AUC↑ | Cross-testing Celeb-DF ACC↑ | AUC↑ | EER↓ | WildDeepfake ACC↑ | AUC↑ | EER↓ |
|---|---|---|---|---|---|---|---|---|---|---|
| 1 | Add-Net [58] | ✗ | 87.50 | 91.01 | - | 65.29 | 38.90 | - | 62.35 | 41.42 |
| 2 | $F^3$-Net [32] | ✗ | 90.43 | 93.30 | - | 61.51 | 42.03 | - | 57.10 | 45.12 |
| 3 | MultiAtt [50] | ✗ | 88.69 | 90.40 | - | 67.02 | 37.90 | - | 59.74 | 43.73 |
| 4 | XceptionNet [35] | ✗ | 86.86 | 89.30 | - | 61.80 | 41.73 | - | 62.72 | 40.65 |
| 5 | XceptionNet(ours) | BLIP-TI | 89.25 | 92.24 | 62.41 | 64.30 | 36.51 | 62.52 | 64.53 | 39.42 |
| 6 | RECCE [7] | ✗ | 91.03 | 95.02 | 67.96 | 68.71 | 35.73 | 62.03 | 64.31 | 40.53 |
| 7 | RECCE-BLIP | BLIP(init) | 89.22 | 93.71 | 68.07 | 68.36 | 36.64 | 65.09 | 67.24 | 37.49 |
| 8 | RECCE (ours) | BLIP-TI | 92.08 | 95.36 | 69.46 | 70.21 | 35.63 | 66.57 | 69.46 | 35.90 |

FIG. 7

| Dataset | Method | Acc↑ | Recall↑ | Precision↑ | F1↑ |
|---|---|---|---|---|---|
| DD-VQA | Det. | 0.7978 | 0.9639 | 0.7588 | 0.8492 |
| DD-VQA | Det.+exp. | 0.8168 | 0.9596 | 0.7861 | 0.8642 |
| SeqDeepfake [39] | Det. | 0.5216 | 0.9739 | 0.5156 | 0.6742 |
| SeqDeepfake [39] | Det.+exp. | 0.5648 | 0.9513 | 0.5521 | 0.6987 |

FIG. 8A

| Method | Acc↑ | Recall↑ | Precision↑ | F1↑ |
|---|---|---|---|---|
| Efficient ViT [9] | 0.6849 | 0.7259 | 0.7538 | 0.7396 |
| Conv. Cross ViT [9] | 0.7763 | 0.7778 | 0.8468 | 0.8108 |
| BLIP-TI (ours) | 0.8719 | 0.9367 | 0.8757 | 0.9052 |

FIG. 8B

| Method | Acc↑ | Recall↑ | Precision↑ | F1↑ |
|---|---|---|---|---|
| Eyebrows | 0.8645 | 0.9189 | 0.8571 | 0.8870 |
| Skin | 0.8899 | 0.9534 | 0.8786 | 0.9145 |
| Eyes | 0.8750 | 0.9224 | 0.8770 | 0.8992 |
| Nose | 0.8800 | 0.9237 | 0.8790 | 0.9008 |
| Mouth | 0.8670 | 0.9459 | 0.8468 | 0.8936 |

| Fine-grained Features | Images | Descriptions |
|---|---|---|
| Boundaries | | The person's skin looks fake. The person's skin looks very fake because there are boundaries on the person's face, such as boundaries on the person's left and right cheeks. |
| Inconsistent skin color | | The person's skin looks fake. The person's skin looks very fake because the person has inconsistent skin color. |
| Discolored patches | | The person's skin looks fake. The person's skin looks very fake because there is a discolored patch on the person's forehead. |

Fake Skin Features.

| Fine-grained Features | Images | Descriptions |
|---|---|---|
| Unnaturally curved nose | | The person's nose looks fake. The person's nose looks unnaturally curved. |
| nose lacks of details | | The person's nose looks fake. The person's nose looks very fake because the nose lacks of pores and fine lines. |

Fake Nose Features.

FIG. 12D

| Fine-grained Features | Images | Descriptions |
|---|---|---|
| Blurry Mouth | | The person's mouth area looks fake. The person's mouth looks blurry and unclear. |
| Mouth with unnatural color | | The person's mouth area looks fake. The person's mouth shows an unnatural white color. |
| unnatural coloring/blurry teeth | | The person's mouth area looks fake. The person's teeth look misaligned with the rest of the mouth. The person's teeth look unnatural coloring. |

Fake Mouth Features.

FIG. 12E

| Fine-grained Features | Images | Descriptions |
|---|---|---|
| Incomplete facial features | | The image looks fake because the person has incomplete facial features. |
| Unclear eyeglass frame | | The image looks fake because the person's eyeglass frame looks unclear. |
| Mustache | | The image looks fake because the person's mustache does not align with other facial features. |

General Fake Features.

FIG. 12F

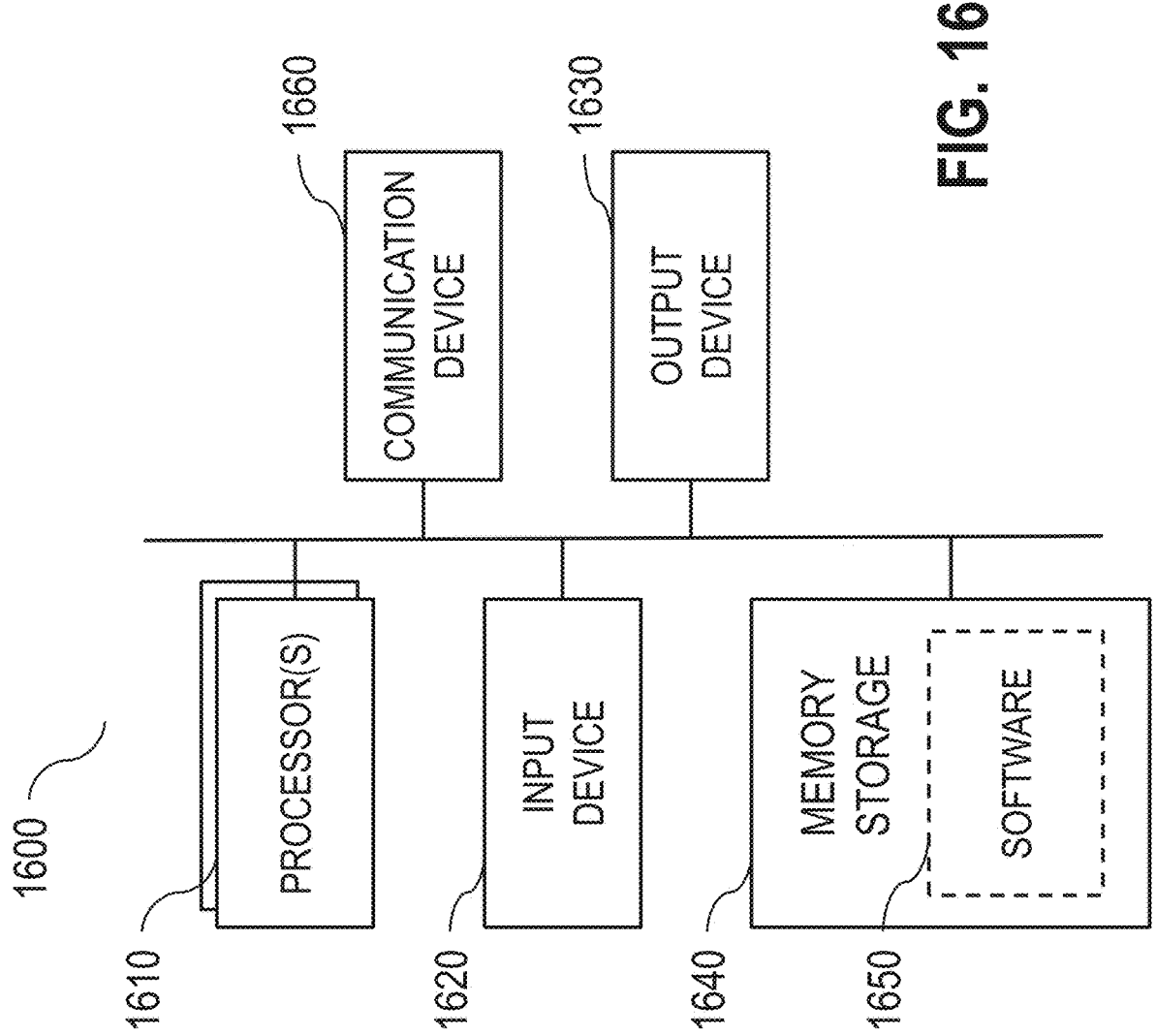

COMMON SENSE REASONING FOR DEEPFAKE DETECTION

CROSS-REFERENCE TO RELATED APPLICATIONS

This application is a continuation of U.S. application Ser. No. 18/751,168, filed Jun. 21, 2024, which claims the benefit of U.S. Provisional Application 63/600,579, filed on Nov. 17, 2023, the entire contents of each of which are incorporated herein by reference.

FIELD

The present disclosure relates generally to machine-learning techniques, and more specifically to deepfake detection.

BACKGROUND

The rise of generative machine-learning techniques enables new capabilities to create and manipulate images. While these advances empower human creativity and enable numerous AI-for-good applications, they can also be used to create and spread misinformation, potentially leading to social problems and security threats. As a result, with the increasing prevalence of generative media (deepfakes), a growing number of advanced deepfake detection algorithms are being developed to discern media authenticity and mitigate such serious concerns.

Previous deepfake detection methods primarily function as binary classifiers, including approaches such as convolution neural networks (CNNs), self-blending techniques, and diffusion model detection. These methods aim to enhance the model's interpretability via saliency maps based on visual features. However, providing detailed explanations for the underlying reasons of authenticity or fakeness, especially in the form of explicit text explanations, remains an area with limited exploration. In fact, answering the question of "Why the image is a deepfake?" is a greater challenge than "Whether the image is a deepfake?". The former requires reasoning and common-sense knowledge that is not explicit in images. While humans utilize commonsense knowledge, especially for semantically meaningful facial attributes (e.g. non-physical facial components or unnatural skin shading), to explain "what's wrong" in an image, current deepfake detection classifiers methods lack such an ability explicitly.

For example, state-of-the-art approaches rely on image-based features extracted via neural networks for the deepfake detection binary classification. While these approaches trained in the supervised sense extract likely fake features, they may fall short in representing unnatural 'non-physical' semantic facial attributes-blurry hairlines, double eyebrows, rigid eye pupils, or unnatural skin shading, even though such facial attributes are generally easily perceived by humans via common sense reasoning. Furthermore, image-based feature extraction methods that provide visual explanation via saliency maps can be hard to be interpreted by humans.

SUMMARY

Disclosed herein are systems, electronic devices, methods, non-transitory storage media, and apparatuses for detecting deepfake images and providing customized analysis. An exemplary system can receive, from a user, a textual user inquiry regarding an image and input the textual inquiry and the image into a deepfake detection model. The deepfake detection model comprises: an image encoder for generating a plurality of image embeddings based on the image; a text encoder for generating a plurality of textual embeddings based on the textual inquiry; one or more layers for generating a plurality of answer embeddings based on the plurality of image embeddings and the plurality of textual embeddings; and a language model for generating a textual analysis based on the plurality of answer embeddings. The system can output a textual analysis, which includes a classification result of whether the image is fake and further includes one or more visual features in the image and one or more attributes of the one or more visual features that contribute to the classification result.

Embodiments of the present disclosure extend the deepfake detection from a binary classification task to a generative visual question-answering task, referred to herein as Deepfake Detection Visual Question Answer (DDVQA) task. In this task, the objective can be to generate answers based on questions and images, where the answers are not limited to providing deepfake detection results but also to describe the corresponding textual explanations grounded in common-sense knowledge. The common sense knowledge in embodiments of the present disclosure is expressed in rich natural language, referring to the commonly shared understanding of the appearance of a fake or real face, such as 'non-physical' fake features like the "overlapped eyebrows". The DD-VQA task aims to improve deepfake detection models' common sense reasoning ability, which is crucial as the models are encouraged to focus on the cognition-perception of authenticity or fakeness, surpassing the conventional emphasis on recognition-level features in the image.

Unlike previous methods that solely offer a general assessment of the entire facial authenticity, users can provide fine-grained questions to assess the authenticity of facial components, including skin, eyebrows, eyes, nose, and mouth. The model can model human intuition in explaining the reason behind labeling an image as either real or fake.

To enable training of the deepfake defection model, a novel dataset, named DD-VQA dataset, that includes the triplets-image, question and answers, is provided. The images in the DD-VQA dataset can be sourced from public databases such as the FaceForensics++ (FF++) dataset. The system can design general and fine-grained questions for each image to inquire about the authenticity of the entire image and facial components. The answers are collected from annotators, who provide both real/fake decisions and corresponding reasons based on their common-sense knowledge.

DD-VQA task is challenging because, besides understanding the question and image, the model needs to (1) determine the authenticity of the individual facial component based on the questions asked and (2) learn common-sense knowledge to generate reasonable textual explanations. The prevailing large Vision-Language (VL) pre-trained models encounter limitations on the DD-VQA task. Such pre-trained VL models tend to provide generic descriptions of facial features and often fall short when distinguishing image authenticity while offering reasonable explanations. Therefore, embodiments of the present disclosure fine-tune a pre-trained VL model with the DD-VQA dataset as the proposed benchmark. Additionally, the system use text and image contrastive losses to enhance the model's representation learning for the deepfake detection task. The contrastive losses strengthen the model's representation learning, helping capture distinct features that differentiate between fake and real images across various modalities. We filter positive and negative images/answers based on textural answers. The cross-modal-learned visual representation is integrated into the deepfake detection models. The system can enhance vision representations of downstream deepfake detection with the vision representations trained on the DD-VQA datasets, improving the model's detection performance and generalization ability.

Accordingly, embodiments of the present disclosure include a novel DD-VQA task and the corresponding dataset enabling the generation of detection decisions along with textual explanations based on common-sense knowledge. This task helps the deepfake detection models obtain common sense knowledge related to the image's authenticity and fakeness. A multi-modal Transformer model is provided as the benchmark. Representation learning for the deepfake detection task is enhanced with a novel text and image contrastive learning formulation. The design helps the model reason over both textural justifications for its detection decision and the referred image region. The learned multi-modal representations are employed in the downstream deepfake detection models to improve their detection performance and generalization ability. The performance of DD-VQA is evaluated in both aspects of deepfake detection and text generation. A comprehensive analysis is provided to show that incorporating textual explanation can improve both detection and interpretability of the deepfake detection model.

An exemplary method for detecting deepfake images and providing customized analysis comprises: receiving, from a user, a textual user inquiry regarding an image; inputting the textual inquiry and the image into a deepfake detection model, wherein the deepfake detection model comprises: an image encoder for generating a plurality of image embeddings based on the image; a text encoder for generating a plurality of textual embeddings based on the textual inquiry; one or more layers for generating a plurality of answer embeddings based on the plurality of image embeddings and the plurality of textual embeddings; and a language model for generating a textual analysis based on the plurality of answer embeddings; and outputting the textual analysis, wherein the textual analysis includes a classification result of whether the image is fake and further includes one or more visual features in the image and one or more attributes of the one or more visual features that contribute to the classification result.

In some embodiments, the visual features include facial features. In some embodiments, the facial features include eyebrows, skin, eyes, nose, mouth, teeth, chin, hair, accessories, shadow, or a combination thereof.

In some embodiments, the textual user inquiry comprises a question about whether the image is fake. In some embodiments, the textual user inquiry comprises a question about whether one or more visual feature in the image are fake.

In some embodiments, the method further comprises: displaying a chatbot user interface for receiving one or more textual inquiries related to the image.

In some embodiments, the one or more layers of the deepfake detection model further comprises: a plurality of cross attention layers.

In some embodiments, the method further comprises generating, using the plurality of cross-attention layers, a plurality of encoded image embeddings and a plurality of encoded text embeddings based on the plurality of image embeddings and the plurality of text embeddings. The one or more layers of the deepfake detection model further comprises: a text decoder. The method can further comprise generating, using the text decoder, a plurality of decoded text embeddings. In some embodiments, the plurality of answer embeddings comprises the plurality of decoded text embeddings. In some embodiments, the text decoder is trained via text contrastive learning.

In some embodiments, the image encoder is trained via image contrastive learning. In some embodiments, the deepfake detection model comprises a BLIP model.

In some embodiments, the deepfake detection model is trained using a training dataset comprising a training image, a corresponding textual inquiry regarding the training image, a classification result of whether the training image is fake, and a corresponding textual response to the textual inquiry. The corresponding textual response to the textual inquiry can be generated by one or more selections of a plurality of predefined descriptors by a human annotator. The deepfake detection model can be trained at least partially by: inputting the corresponding textual response to the textual inquiry into a plurality of causal self-attention layers.

An exemplary system for detecting deepfake images and providing customized analysis comprises: one or more processors; one or more memories; and one or more programs, wherein the one or more programs are stored in the one or more memories and configured to be executed by the one or more processors, the one or more programs including instructions for: receiving, from a user, a textual user inquiry regarding an image; inputting the textual inquiry and the image into a deepfake detection model, wherein the deepfake detection model comprises: an image encoder for generating a plurality of image embeddings based on the image; a text encoder for generating a plurality of textual embeddings based on the textual inquiry; one or more layers for generating a plurality of answer embeddings based on the plurality of image embeddings and the plurality of textual embeddings; and a language model for generating a textual analysis based on the plurality of answer embeddings; and outputting the textual analysis, wherein the textual analysis includes a classification result of whether the image is fake and further includes one or more visual features in the image and one or more attributes of the one or more visual features that contribute to the classification result.

An exemplary non-transitory computer-readable storage medium stores one or more programs for detecting deepfake images and providing customized analysis, the one or more programs comprising instructions, which when executed by one or more processors of an electronic device, cause the electronic device to perform: receiving, from a user, a textual user inquiry regarding an image; inputting the textual inquiry and the image into a deepfake detection model, wherein the deepfake detection model comprises: an image encoder for generating a plurality of image embeddings based on the image; a text encoder for generating a plurality of textual embeddings based on the textual inquiry; one or more layers for generating a plurality of answer embeddings based on the plurality of image embeddings and the plurality of textual embeddings; and a language model for generating a textual analysis based on the plurality of answer embeddings; and outputting the textual analysis, wherein the textual analysis includes a classification result of whether the image is fake and further includes one or more visual features in the image and one or more attributes of the one or more visual features that contribute to the classification result.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 2A illustrates an exemplary process for detecting deepfake images and providing customized analysis, in accordance with some embodiments.

FIG. 4 illustrates exemplary fine-grained questions and corresponding answers, in accordance with some embodiments.

FIG. 5 provides exemplary descriptive expressions (i.e., pre-defined answers) to specify the reasons for the authenticity and fakeness of different facial components.

FIG. 6 provides exemplary experimental results after fine-tuning BLIP with the DD-VQA dataset, in accordance with some embodiments.

FIG. 7 provides exemplary experimental results on multimodal enhanced deepfake detection, in accordance with some embodiments.

FIG. 8A provides exemplary results of BLIP trained on the data with or without explanations, in accordance with some embodiments.

FIG. 8B provides an exemplary comparison with ViT-based Deepfake Detection Models, in accordance with some embodiments.

FIG. 9 provides exemplary deepfake detection performance on fine-grained questions, in accordance with some embodiments.

FIG. 10 illustrates exemplary qualitative examples, in accordance with some embodiments.

FIGS. 12A-12F provide examples of fine-grained fake facial features and the corresponding descriptions in the dataset, in accordance with some embodiments.

FIG. 16 illustrates an exemplary electronic device, in accordance with some embodiments.

DETAILED DESCRIPTION

Figure 1A:
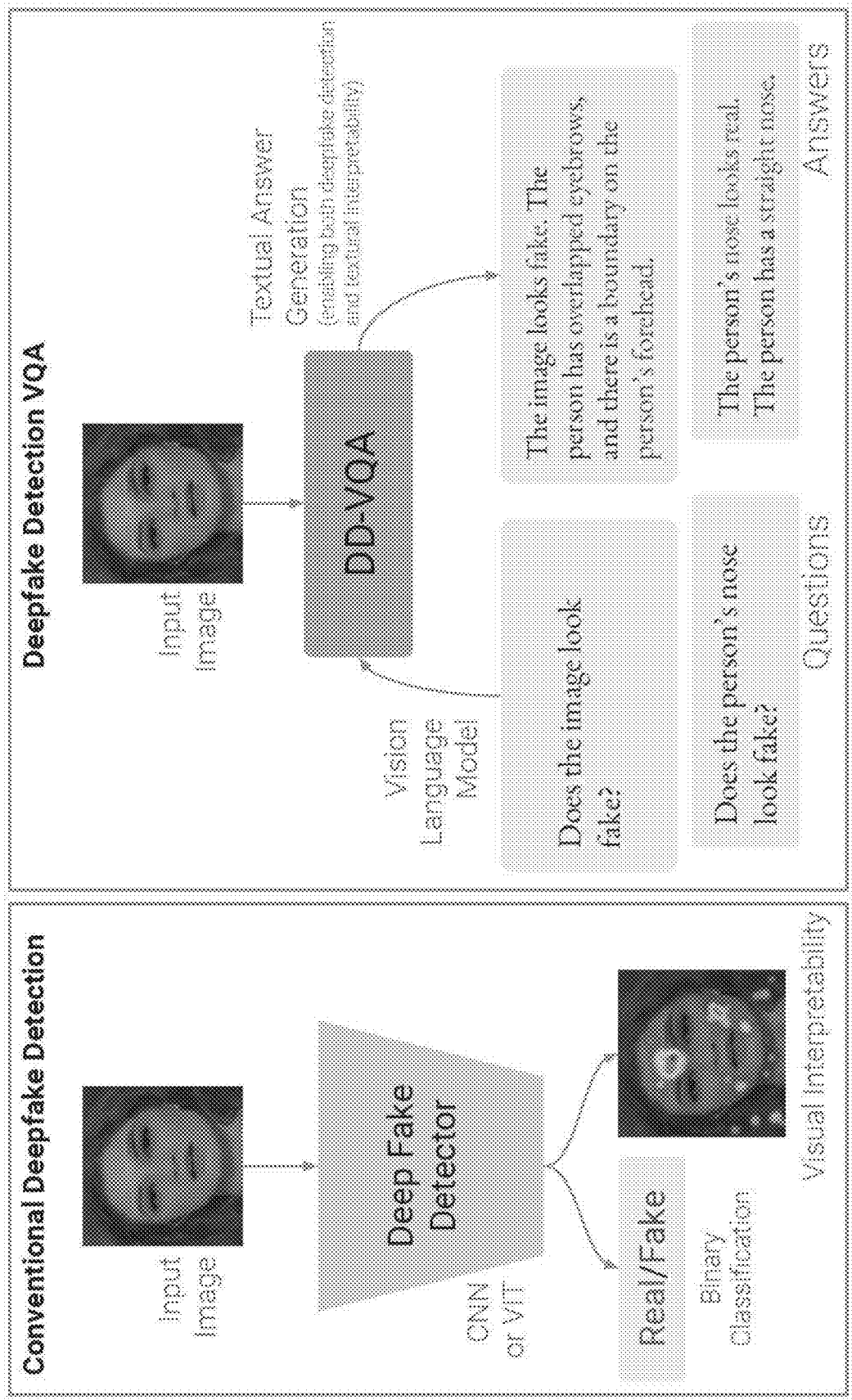
FIG. 1A illustrates a comparison between conventional deepfake detection and an embodiment of the present disclosure, in accordance with some embodiments.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Disclosed herein are systems, electronic devices, methods, non-transitory storage media, and apparatuses for detecting deepfake images and providing customized analysis. An exemplary system can receive, from a user, a textual user inquiry regarding an image and input the textual inquiry and the image into a deepfake detection model. The deepfake detection model comprises: an image encoder for generating a plurality of image embeddings based on the image; a text encoder for generating a plurality of textual embeddings based on the textual inquiry; one or more layers for generating a plurality of answer embeddings based on the plurality of image embeddings and the plurality of textual embeddings; and a language model for generating a textual analysis based on the plurality of answer embeddings. The system can output a textual analysis, which includes a classification result of whether the image is fake and further includes one or more visual features in the image and one or more attributes of the one or more visual features that contribute to the classification result.

Embodiments of the present disclosure extend the deepfake detection from a binary classification task to a generative visual question-answering task, referred to herein as Deepfake Detection Visual Question Answer (DDVQA) task. In this task, the objective can be to generate answers based on questions and images, where the answers are not limited to providing deepfake detection results but also to describe the corresponding textual explanations grounded in common-sense knowledge. The common sense knowledge in embodiments of the present disclosure is expressed in rich natural language, referring to the commonly shared understanding of the appearance of a fake or real face, such as 'non-physical' fake features like the "overlapped eyebrows". The DD-VQA task aims to improve deepfake detection models' common sense reasoning ability, which is crucial as the models are encouraged to focus on the cognition-perception of authenticity or fakeness, surpassing the conventional emphasis on recognition-level features in the image.

Unlike previous methods that solely offer a general assessment of the entire facial authenticity, users can provide fine-grained questions to assess the authenticity of facial components, including skin, eyebrows, eyes, nose, and mouth. The model can model human intuition in explaining the reason behind labeling an image as either real or fake.

To enable training of the deepfake defection model, a novel dataset, named DD-VQA dataset, that includes the triplets-image, question and answers, is provided. The images in the DD-VQA dataset can be sourced from public databases such as the FaceForensics++ (FF++) dataset. The system can design general and fine-grained questions for each image to inquire about the authenticity of the entire image and facial components. The answers are collected from annotators, who provide both real/fake decisions and corresponding reasons based on their common-sense knowledge.

DD-VQA task is challenging because, besides understanding the question and image, the model needs to (1) determine the authenticity of the individual facial component based on the questions asked and (2) learn common-sense knowledge to generate reasonable textual explanations. The prevailing large Vision-Language (VL) pre-trained models encounter limitations on the DD-VQA task. Such pre-trained VL models tend to provide generic descriptions of facial features and often fall short when distinguishing image authenticity while offering reasonable explanations. Therefore, embodiments of the present disclosure fine-tune a pre-trained VL model with the DD-VQA dataset as the proposed benchmark. Additionally, the system use text and image contrastive losses to enhance the model's representation learning for the deepfake detection task. The contrastive losses strengthen the model's representation learning, helping capture distinct features that differentiate between fake and real images across various modalities. We filter positive and negative images/answers based on textural answers. The cross-modal-learned visual representation is integrated into the deepfake detection models. The system can enhance vision representations of downstream deepfake detection with the vision representations trained on the DD-VQA datasets, improving the model's detection performance and generalization ability.

Accordingly, embodiments of the present disclosure include a novel DD-VQA task and the corresponding dataset enabling the generation of detection decisions along with textual explanations based on common-sense knowledge. This task helps the deepfake detection models obtain common sense knowledge related to the image's authenticity and fakeness. A multi-modal Transformer model is provided as the benchmark. Representation learning for the deepfake detection task is enhanced with a novel text and image contrastive learning formulation. The design helps the model reason over both textural justifications for its detection decision and the referred image region. The learned multi-modal representations are employed in the downstream deepfake detection models to improve their detection performance and generalization ability. The performance of DD-VQA is evaluated in both aspects of deepfake detection and text generation. A comprehensive analysis is provided to show that incorporating textual explanation can improve both detection and interpretability of the deepfake detection model.

Deficiencies of Conventional Approaches

Deep learning methods are the dominant approaches for the deepfake detection task. The traditional CNN-based methods such as Xception and EfficentNet have achieved satisfying results in intra-dataset. To improve the generalization ability, Face X-ray identify boundary inconsistencies as a common forgery cue to incorporate domain prior knowledge to encourage the model to learn general forgery features. Some works have explored Multi-modal models in deepfake detection task. However, there is very limited research integrating natural language into deepfake datasets or deepfake detection models. VLFFD proposes a visual-linguistic paradigm to use language as supervision to improve deepfake detection, but their text information is automatically generated and only focuses on aspects like manipulation region, type, and method. In embodiments of the present disclosure, a novel VQA dataset is provided that offers free-form textual explanations regarding the authenticity of the image based on human common-sense knowledge.

The current methods for interpretable deepfake detection models primarily treat deepfake detection as a binary classification task. The approaches used to interpret deepfake detection models mainly align with the methods used to explain neural network classifiers. The prominent approach uses gradient-based methods to visualize the highlight regions for the prediction. Another line of research attempts to build an interpretable network by model design; for instance, DFGNN applies interpretable GNN to deepfake detection tasks. DPNET propose an interpretable prototype-based neural network that captures dynamic features to explain the prediction. While these methods have been used to enhance the model's interpretability, describing the reasons for the determination in natural language has yet to be explored extensively. Embodiments of the present disclosure include a novel VQA task that generates deepfake detection results and the corresponding textual reasons. By doing so, the systems can enhance the interpretability of deepfake detection models by generating explicit textual explanations.

Multi-modal learning, especially Vision-Language (VL) learning, has gained significant attention within the AI community. Recently, an increasing number of large VL pre-training models have emerged, such as BLIP, Flamingo, and MiniGPT4. These models are all based on the Transformer architecture and have been trained on various VL datasets and tasks. These large VL models have achieved remarkably high performance in many applications, such as Visual Question Answering (VQA), Vision and Language Navigation (VLN), and Image Captioning. Despite their popularity, relatively little research has been dedicated to examining these models' performance in deepfake detection. In embodiments of the present disclosure, current Vision-Language (VL) pre-training models are applied to our proposed deepfake detection VQA dataset to explore their capacity for the deepfake detection task.

Visual Question Answering (VQA) has been one of the most popular research topics. The task requires reasoning ability on visual images and textual questions to predict the correct answer. A large-scale VQA dataset with free-form questions created by humans has been proposed. VQA v2.0 introduces a more balanced dataset by reducing the language biases in the VQA dataset. OK-VQA extends the in-domain VQA task with external knowledge. Embodiments of the present disclosure extends deepfake detection into the research area of the VQA task. Our VQA task is a generative rather than a classification task to select the best answer from a set of pre-defined answers.

FIG. 1A illustrates a comparison between conventional deepfake detection and an embodiment of the present disclosure. As shown, the conventional method categorizes deepfake detection as a binary classification task. The output saliency map may be difficult to interpret and does not include any textual explanation to articular the reasoning for the binary classification. In contrast, the VQA model performs a multi-modal task, enabling the generation of real/fake answers and corresponding explanations in response to a given question. In the depicted example, the person's overlapped eyebrows is an obvious indicator of fakeness, whereas the person's naturally straight nose appears relatively realistic.

Figure 1B:
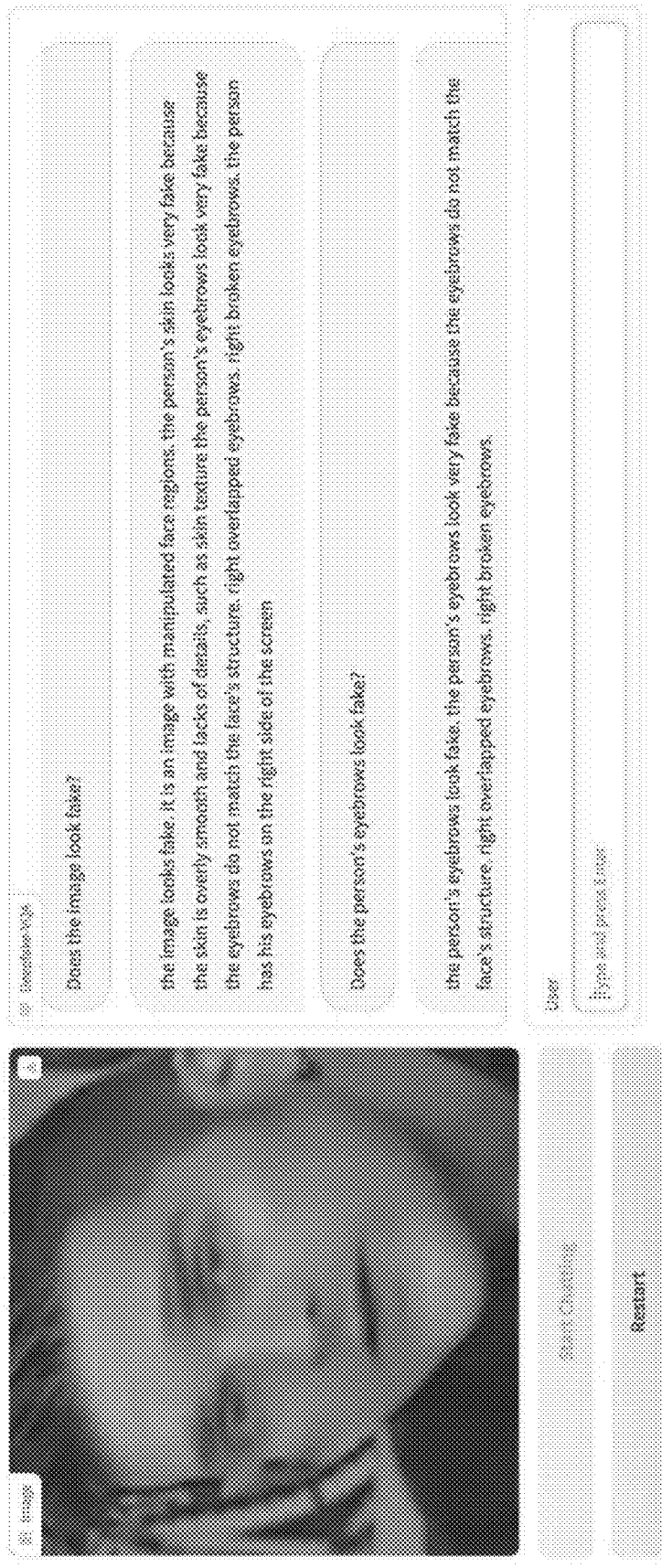
FIG. 1B illustrates an exemplary user interface, in accordance with some embodiments.

FIG. 1B illustrates an exemplary user interface, in accordance with some embodiments. The user interface provides one or more user interface controls for inputting an image and a chat interface 102. A user can upload an image and enter one or more questions about the authenticity of the image in the chat interface 102. The chat interface 102 can respond to general questions such as "does the image look fake" and specific questions such as "does the person's eyebrows look fake." The question and the image can be provided to a deepfake detection model (e.g., deepfake detection model 250) to obtain the answer to the question.

FIG. 2 illustrates an exemplary process 200 for detecting deepfake images and providing customized analysis, in accordance with some embodiments. Process 200 is performed, for example, using one or more electronic devices implementing a software platform. In some examples, process 200 is performed using a client-server system, and the blocks of process 200 are divided up in any manner between the server and a client device. In other examples, the blocks of process 200 are divided up between the server and multiple client devices. Thus, while portions of process 200 are described herein as being performed by particular devices of a client-server system, it will be appreciated that process 200 is not so limited. In other examples, process 200 is performed using only a client device or only multiple client devices. In process 200, some blocks are, optionally, combined, the order of some blocks is, optionally, changed, and some blocks are, optionally, omitted. In some examples, additional steps may be performed in combination with the process 200. Accordingly, the operations as illustrated (and described in greater detail below) are exemplary by nature and, as such, should not be viewed as limiting.

At block 202, an exemplary system (e.g., one or more electronic devices) receives, from a user, a textual user inquiry regarding an image. The textual user inquiry can include one or more questions about the authenticity of the image (e.g., a person depicted in the image). The textual user inquiry can include general questions, fine-grained questions, or a combination thereof. A general question can be directed to assessing the overall authenticity of the person depicted in the image. The format of the general question can be, for example, "Does the person in the image look fake?" A fine-grained question can be directed to assessing the authenticity of individual facial components (skin, eyes, and etc.). There are instances where specific facial components may still exhibit authenticity despite the overall image appearing fake. The detailed facial features include eyebrows, skin, eyes, nose, and mouth. The format of the fine-grained feature question can be, for example, "Do the person's X look real fake?", and X is any facial component.

At block 204, the system inputs the textual inquiry and the image into a deepfake detection model. The deepfake detection model can include an image encoder for generating a plurality of image embeddings based on the image, a text encoder for generating a plurality of textual embeddings based on the textual inquiry, one or more layers for generating a plurality of analysis embeddings based on the plurality of image embeddings and the plurality of textual embeddings, and a language model for generating a textual analysis based on the plurality of analysis embeddings. Additional details regarding the architecture and the operations of the deepfake detection model are described herein with reference to FIG. 2B.

At block 206, the system outputs a textual analysis. The textual analysis includes a classification result of whether the image is fake and further includes one or more visual features in the image and one or more attributes of the one or more visual features that contribute to the classification result. In some embodiments, the visual features include facial features including eyebrows, skin, eyes, nose, mouth, teeth, chin, hair, accessories, shadow, or a combination thereof. Exemplary textual analyses are provided herein with reference to FIG. 1B above.

In some embodiments, the system can display a chatbot user interface for receiving the textual user inquiry in block 202 and for outputting the textual analysis in block 204. An exemplary user interface is provided in FIG. 1B.

Figure 2B:
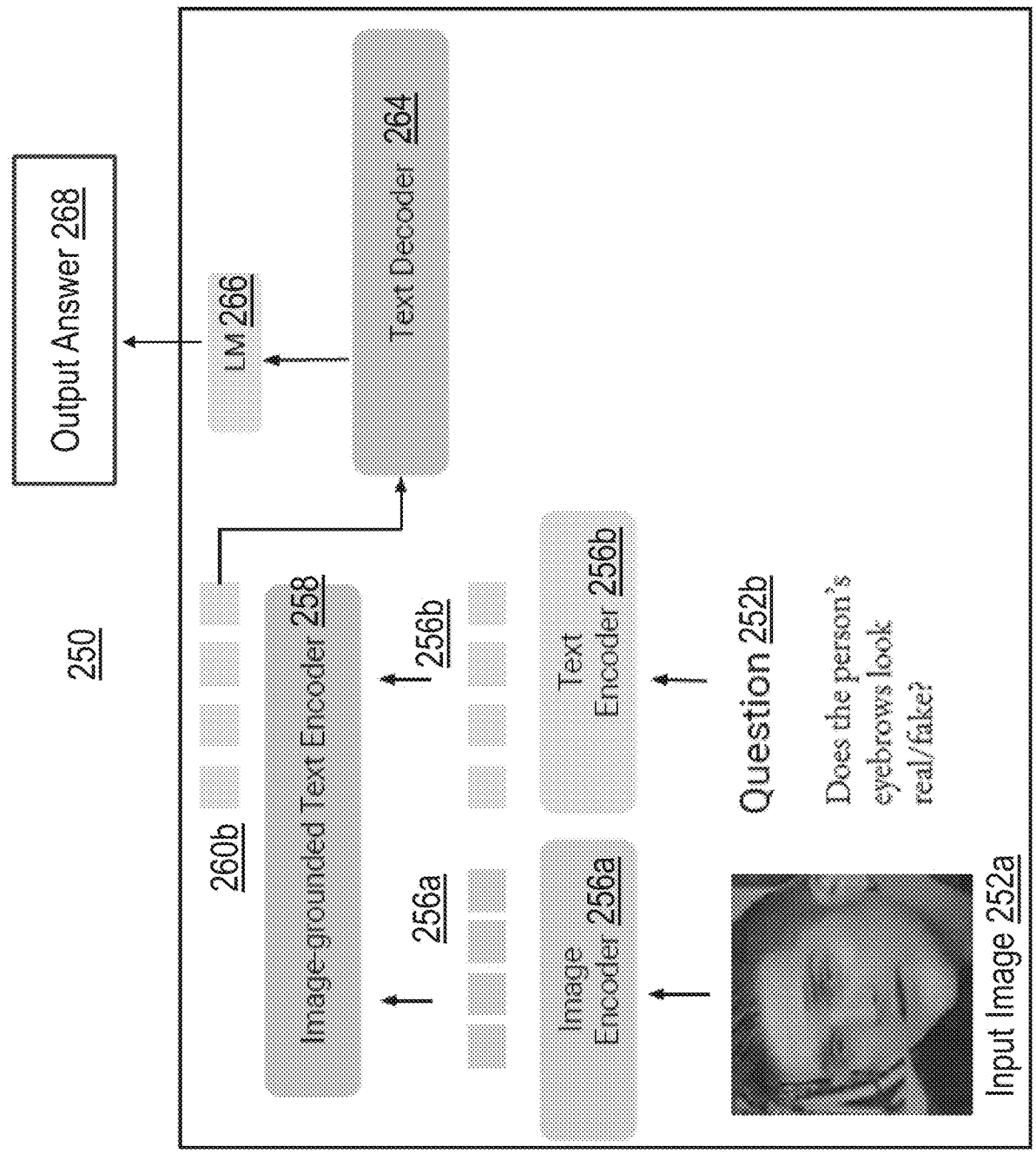
FIG. 2B illustrates an exemplary architecture of a deepfake detection model, in accordance with some embodiments.

FIG. 2B illustrates an exemplary architecture of a deepfake detection model, in accordance with some embodiments. The deepfake detection model 250 can be configured to generate answers given an image and a question to discern facial authenticity. In some embodiments, BLIP is used as the backbone of the model. BLIP is a robust Transformer-based VL model that is pre-trained on noisy web data and bootstraps captions. BLIP can be a strong backbone due to its competitive performance across various vision and language tasks, as well as its case of training. In some embodiments, the deepfake detection model takes the image and question as input and generate textual answers in an autoregressive manner. To enhance representation learning, two contrastive losses are used.

With reference to FIG. 2B, the deepfake detection model 250 comprises an image encoder 254a, a text encoder 254b, an image-grounded text encoder 258 (which can comprise a plurality of cross-modal attention layers), a text decoder 262, and a language model 266. The deepfake model receives an input image 252a and an input question 252b (e.g., block 202 in FIG. 2A), inputs the input image 252a and the input question 252b into the deepfake detection model (e.g., block 204 in FIG. 2A), and outputs an answer 268 (e.g., block 206 in FIG. 2A). The answer 268 can include a textual analysis. The textual analysis includes a classification result of whether the image is fake and further includes one or more visual features in the image and one or more attributes of the one or more visual features that contribute to the classification result.

With reference to FIG. 2B, the image encoder 254a receives the input image 252a and generates a plurality of image embeddings 256a based on the image. In some embodiments, the system can split the input image 252a into a plurality of image patches and generate an image embedding based on each image patch. An image embedding is a vector representation of image data and can represent features and/or characteristics of the image data in a reduced dimension. By converting image data into a numerical vector, it becomes easier to perform downstream analysis of the image data (e.g., by performing mathematic operations and comparisons). The image encoder 254a can include a neural network (e.g., convolutional neural networks or CNNs) that is configured to receive image data and output an image embedding. In some embodiments, the image encoder 254a comprises a Vision Transformer (ViT). The image is first divided into m patches, and then encoded as a sequence of embeddings with a [CLS] token as the global image representations. The [CLS] token is a special token added to a sequence during pre-processing and provides a single representation for the entire sequence, enabling downstream models to generate output based on the global context. In some embodiments, the visual representations from the ViT (i.e., the image embeddings 256a) is denoted as $I=[i_1, i_2, \ldots, i_m]$.

The text encoder 256b receives the input question 252b and generates a plurality of textual embeddings 256a based on the input questions 252b. In some embodiments, the system can split the input question 252b into a plurality of textual tokens and generate a textual embedding based on each textual token. A textual embedding is a vector representation of textual data and can represent information and/or features of the textual data. The text encoder 256b can include a neural network that is configured to receive textual data and output a textual embedding. In some embodiments, the text encoder 256b can comprise a multi-layer self-attention block. For example, the input question 252b can be denoted as Q and a tokenizer (e.g., a BERT tokenizer) is used to split the question into a sequence of tokens, denoted as Q={[CLS], $q_1, q_2, \ldots, q_l$, [September]}, where l is the length of question tokens. In the BERT model, the [September] token is used to separate different segments of input text when multiple sequences are provided as input. The sequence of tokens is passed through a text encoder (e.g., a multi-layer self attention block) to obtain the text representations, denoted as $X_q = [x_{q1}, x_{q2}, \ldots, x_{ql}]$.

The image embeddings 256a and the textual embeddings 256b are provided to the image-grounded text encoder 258. Specifically, the system applies cross-modal attention layers 258 between the textual embeddings 256b (i.e., the text representations of question $X_q$) and the image embeddings 256a (i.e., the visual representations of image V) to inject visual information to the question. The system obtains the attended text representation 260b, denoted as $\overline{X}^-_q$, as follows, $$\overline{X}_q = \text{cross\_attn}(Q = X_q, K = I, V = 1), \quad (1)$$

where Q, K and V are the query, key, and value for attention calculation, respectively.

The attended text representation 260 is provided to a text decoder 262 to obtain a sequence of answer tokens or answer embeddings. The sequence of answer tokens is provided to the language model 266 to generate the output answer 268.

Figure 2C:
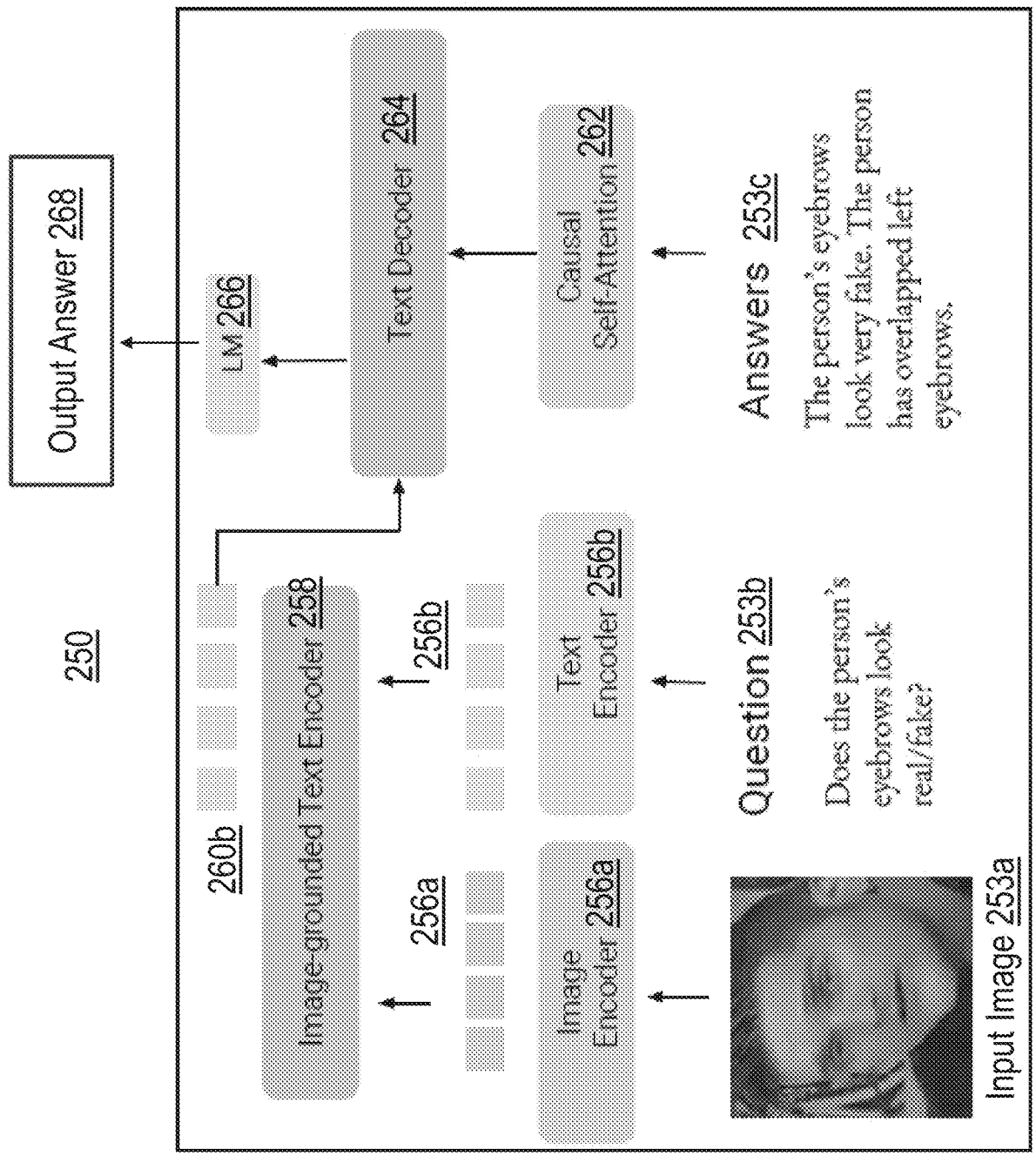
FIG. 2C illustrates an exemplary training setup for the deepfake detection model 250, in accordance with some embodiments.

FIG. 2C illustrates an exemplary training setup for the deepfake detection model 250, in accordance with some embodiments. In FIG. 2C, a training data set is used to train the deepfake detection model 250. The training dataset can comprise a plurality of images and, for each image, one or more associated questions and one or more associated answers. In the depicted example, the training dataset includes at least an input image 253a, a question 253b, and an answer 253c to the question 253b. The training setup further includes a causal self-attention module 262. Similar to a question, the system applies a BERT tokenizer to the answer 253c to obtain a sequence of answer tokens, denoted as A={[CLS], $a_1, a_2, \ldots, a_k$, [September]}, where k is the length of tokens. The system can also acquire text representations of the answer through BERT. However, instead of utilizing self-attention as in the text encoder for question, the system can employ causal self-attention layers to only attend to the previous tokens instead of all tokens. The system can represent the text representations of the answer as $X_a = [x_{a1}, x_{a2}, \ldots, x_{ak}]$. Subsequently, another cross-modal attention layer for decoding the next token is applied between the attended question representation $\overline{X}^-_q$ and $X_a$, as follows, $$\overline{X}_a = \text{cross\_attn}(Q = X_a, K = \overline{X}_q, V = \overline{X}_q), \quad (2)$$

where, $\overline{X}^-_a$ is the attended answer representation given image and question, which is then fed to a Multi-layer Perceptron (MLP) to predict the answer tokens.

The system can use the following objectives to train the model: language modeling to generate answer tokens, text, and image contrastive learning to leverage annotated textual information to enhance the model's capability to distinguish between real and fake facial components.

Language Modeling aims to generate answer tokens autoregressively, given a question and an image. Specifically, it is a cross-entropy loss that maximizes the likelihood of the answer tokens conditioned on the previous tokens and the attended question representations, as follows:

$$\mathcal{L}_{LM} = -\sum_{j=1}^{k} \log p_\theta(a_j \mid a_1, \ldots, a_{j-1}, \overline{X}_q), \quad (3)$$

where θ denotes the model's trainable parameters. There are a maximum of three candidate answers for each question, and the system can compute the average loss of all answers.

Contrastive learning is a type of self-supervised learning method used in machine learning and artificial intelligence. The model is trained to differentiate between positive pairs and negative pairs of data samples. Positive pairs are pairs of data samples that are considered similar or related in some way. Negative pairs are pairs of data samples that are considered dissimilar or unrelated. The goal of contrastive learning is to train a model to map similar data samples close together (e.g., as embeddings) in a latent space while pushing dissimilar samples apart. This can be done by maximizing the similarity between positive pairs and minimizing the similarity between negative pairs. Contrastive learning is advantageous because it does not require labeled data for training. Instead, it leverages the inherent structure in the data itself to learn useful representations. These learned representations can then be used for downstream tasks.

Figures 2D, 2E:
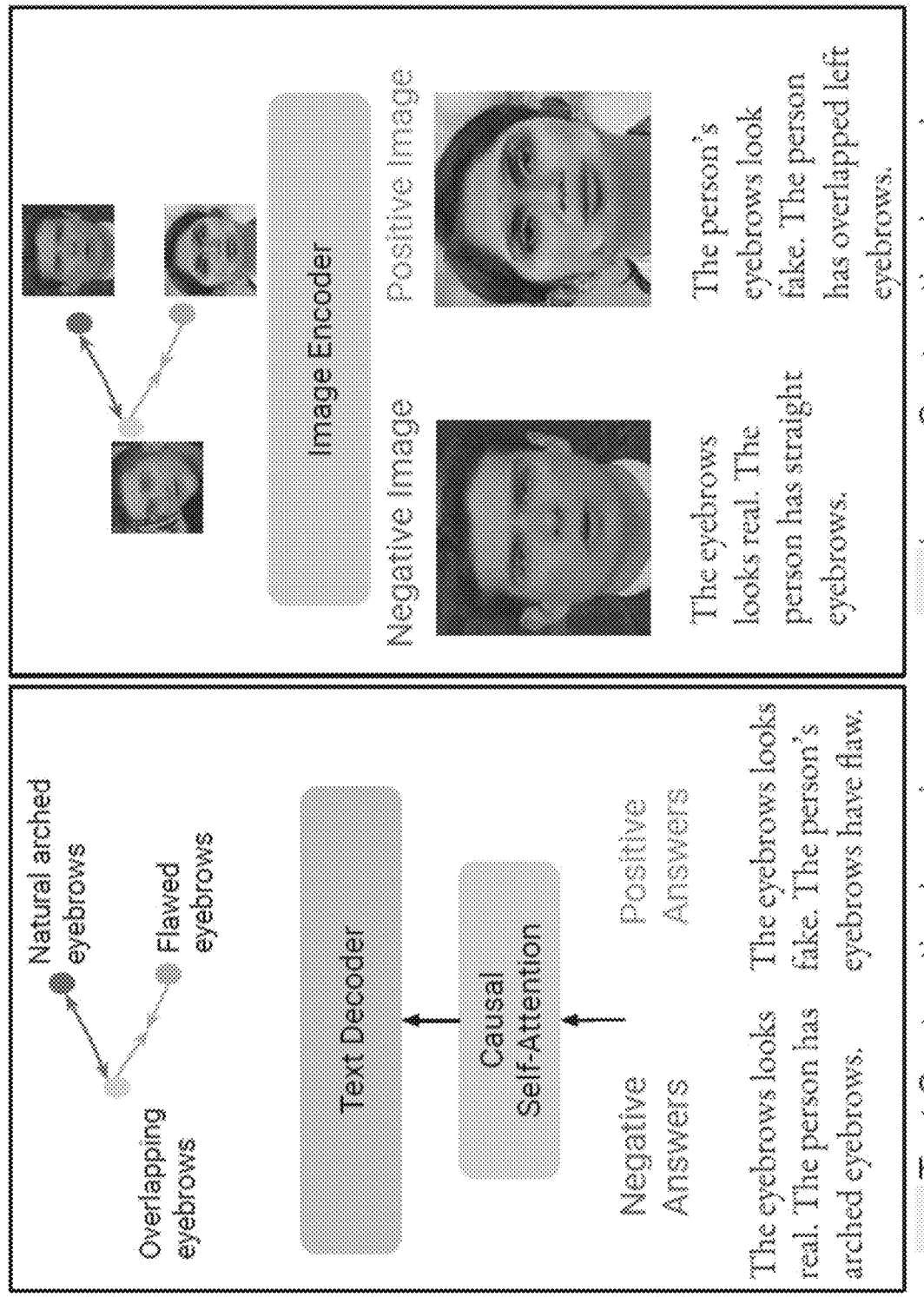
FIG. 2D illustrates exemplary negative and positive answers provided to optimize the text encoder and decoder, in accordance with some embodiments.
FIG. 2E illustrates exemplary answers to filter the negative and positive images used to optimize the image encoder, in accordance with some embodiments.

Text Contrastive Learning aims to train the model with different answers given the same images and questions. The system can filter a negative and a positive answer based on ground-truth answers. The negative answers are obtained by choosing answers on the same facial component but with the opposite detection results. For instance, as shown in FIG. 2D, negative and positive answers are provided to optimize the text encoder and decoder. For example, the negative answer is the description of "real eyebrows" given the groundtruth "fake eyebrows". The positive answer is randomly selected from the candidate answers of the current example. The system can input negative and positive answers to the text encoder 264 and use the corresponding representation of the [CLS] token representation from the last layer of the decoder to do text contrastive learning. The system can denote anchor, positive and negative answer representation as $X^-_{aa}$, $X^-_{ap}$ and $X^-_{an}$, respectively. Then, the InfoNCE loss is used for contrastive learning as follows, $$\mathcal{L}_\tau = -\log \frac{\exp(\overline{X}_{aa} \cdot \overline{X}_{ap})/\tau}{(\exp(\overline{X}_{aa} \cdot \overline{X}_{ap}) + \exp(\overline{X}_{aa} \cdot \overline{X}_{an}))/\tau}, \quad (4)$$

where τ is the temperature. The aim is to learn the attended text representation that is close to the positive answer but far apart from the negative answer.

Image Contrastive Learning aims to learn the visual representation that can help the model generate correct answers. The system can train the model with different images given the same question and answer. The system can filter the positive and negative images based on the answer of the input image. For example, in FIG. 2E, answers to filter the negative and positive images are used to optimize the image encoder. For example, when the answer is "overlapped eyebrows", the positive image is the one annotated as "overlapped eyebrows" and the negative image is the one annotated as "natural eyebrows". After obtaining positive and negative images, the system can optimize the image encoder 256a. The system can use [CLS] token representation from ViT to do image contrastive learning. The system can represent the anchor, positive and negative image representation as $i_a$, $i_p$, and $i_n$, and calculate losses as follows $$\mathcal{L}_I = -\log \frac{\exp(i_a \cdot i_p)/\tau}{(\exp(i_a \cdot i_p) + \exp(i_a \cdot i_n))/\tau} \quad (5)$$

The final objective to train the model can be the sum of the three above losses, denoted as:

$$L = L_{LM} + L_T + L_I \quad (6)$$

In some embodiments, the system can utilize the learned multi-modal representation from the DD-VQA to augment the vision representation of the current deepfake detection model, enhancing its binary detection performance, as depicted in FIG. 2F. Given the input image, the system can first extract representations from the DD-VQA, and then incorporate such representations with any given existing deepfake detector containing a vision encoder and classification head. Moreover, the DD-VQA feature enhancement is model-agnostic. More formally, given an image, the system can obtain vision representations of the DD-VQA model and deepfake detector, which are denoted F∈ $\mathbb{R}^{W \times H \times C}$ and F'∈ $\mathbb{R}^{W' \times H' \times C'}$, respectively. Then the system can have the enhanced deepfake detector vision representations $F^{en.}$ as $F^{en.}=F'+\theta(F)$ where $\theta(*)$ represents the necessary tensor shape transformations for fusing F and F'.

The model can be trained using a training dataset. The training dataset can comprise a training image, a corresponding textual inquiry regarding the training image, a classification result of whether the training image is fake, and a corresponding textual response to the textual inquiry. In some embodiments, the corresponding textual response to the textual inquiry is generated by one or more selections of a plurality of predefined descriptors by a human annotator. As described with reference to FIG. 2C, the deepfake detection model can be trained at least partially by inputting the corresponding textual response to the textual inquiry into a plurality of causal self-attention layers.

Figure 3A:
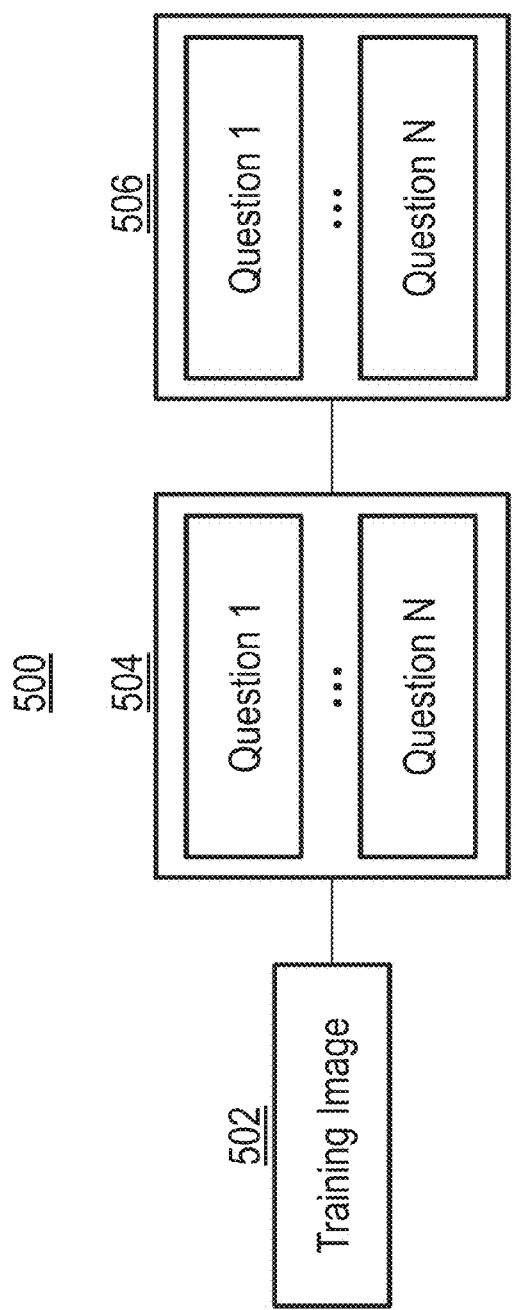
FIG. 3A illustrates a portion of an exemplary training dataset, in accordance with some embodiments.

In some embodiments, the training dataset can comprise a plurality of images and, for each image, one or more associated questions and one or more associated answers. FIG. 3 illustrates a portion of an exemplary training dataset. With reference to FIG. 3A, a training image 302 is associated with N questions 304 and N corresponding answers 306.

The training images such as the training image 302 can comprise real images and fake images. The real images and fake images can depict human faces. The fake images can be generated using any image manipulation method, such as Deepfakes, Face2Face, FaceSwap, and NeuralTextures. In some embodiments, the fake images can be collected from a database such as the FaceForensics++ dataset (FF++). The FF++ dataset contains 5000 videos. Among these, 1000 videos are real, while 4000 videos are fake. In some embodiments, the system extracts one frame from each video in the FF++ dataset and crop the human face from the frame. The image can be sized (e.g., at 480×480 pixels) with complete human faces.

The questions associated with a training image (e.g., questions 304 associated with the training image 302) can include general questions, fine-grained questions, or a combination thereof. A general question can be directed to assessing the overall authenticity of the person depicted in the image. The format of the general question can be, for example, "Does the person in the image look fake?" The answers to this question cover the general reasons for authenticity or fakeness. For example, the general fakeness factors include "obvious manipulated region", "incomplete face feature", "unrealistic texture or lighting", etc. Conversely, the general reasons for authenticity can include "complete face features", "facefeatures in good shape, size, and positioning", "natural expression", etc.

Figure 4:
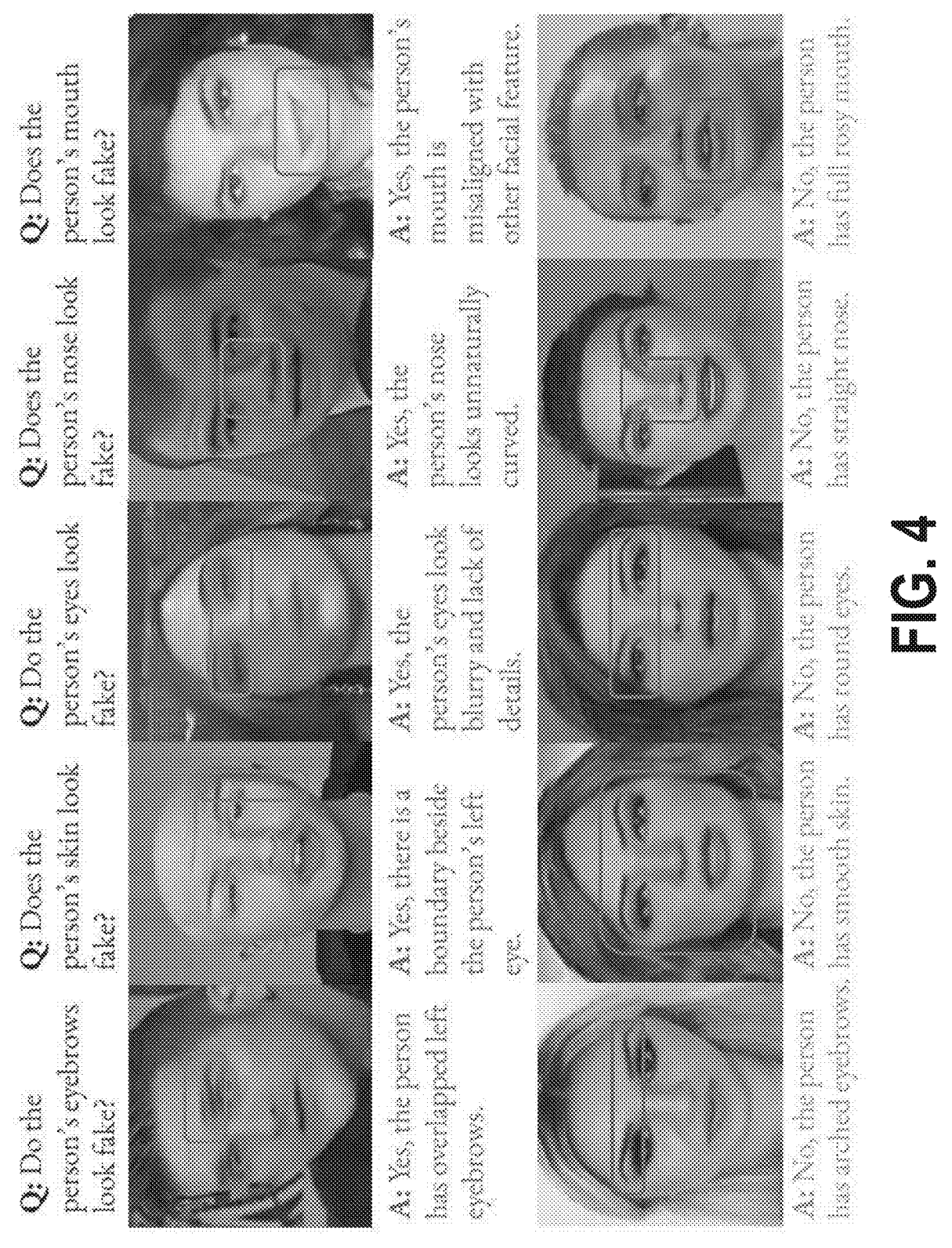

A fine-grained question can be directed to assessing the authenticity of individual facial components (skin, eyes, and etc.). There are instances where specific facial components may still exhibit authenticity despite the overall image appearing fake. The detailed facial features include eyebrows, skin, eyes, nose, and mouth. The format of the fine-grained feature question is "Do the person's X look real fake?", and X is any facial component. FIG. 4 illustrates exemplary fine-grained questions and corresponding answers.

For both types of questions, the corresponding answer can include both a binary yes-or-no answer and a detailed factors based on common-sense knowledge. In order to generate the answers in the training dataset, the system can present a training image and one or more questions to a human annotator to provide answers. In some embodiments, the system can provide a set of predefined reasons based on human common-sense knowledge. FIG. 5 provides exemplary descriptive expressions (i.e., pre-defined answers) to specify the reasons for the authenticity and fakeness of different facial components. These expressions are formulated as multiple-choice lists for annotators to select when responding to each question. Additionally, annotators maintain the flexibility to provide additional explanations, contributing to refining the answer lists.

The pre-defined answers can be designed to capture the unnatural appearance of the fake facial components. There are shared common traits and characteristics that can be utilized to identify manipulated images. For eyebrows, humans commonly have a pair of eyebrows with a symmetrical shape, smooth hair, and a dark color. The presence of overlapping, broken and blurred eyebrows can serve as indicators of manipulated images. For skin, common skin generally exhibit clarity, an even skin tone, and a smooth texture, especially at lower resolutions. The presence of boundaries, discolored patches, or drastically inconsistent skin color on the face are not characteristic of a real person's face. For eyes, common eyes include the characteristics of symmetry, clarity, expressiveness, an appropriate size, etc. The blurred and asymmetric eyes in the manipulated image can indicate fakeness. For nose, an ideal nose should be appropriately positioned, with clear and proportionate nostrils in terms of shape and size. However, the unnaturally curved nose or nose without fine lines are obvious fake signs. For the mouth area (including lips, teeth and chin), the appearance of inappropriate size and color of these areas could be used to indicate fakeness.

In some embodiments, the pre-defined answers can also include expression-related reasons, such as "furrowed eyebrows", "rigid eyes", and "rigid mouth", which is can be important to deepfake detection. In contrast, if the facial components appear authentic, the answers include corresponding descriptive expressions, such as "arched eyebrows", "round eyes", "straight nose", etc. In some embodiments, the pre-defined answers also include other features such as haircut, mustache, beard, glass frames and the image's background.

After collecting the annotation of answers for each question, the system can employ a template-based method to post-process the annotators' choices and any additional reasons they provide. The template of the answer can be "The X looks real/fake because X looks Y", where X represents the entire image or any facial component, and Y denotes the corresponding reason. In cases with multiple reasons, commas can be used to combine them as the final answer. Additionally, for general questions, except for collecting the provided general reasons, reasons can be randomly selected from the fine-grained answers of the same image as its complementary reasons. This helps to answer general questions more comprehensively.

In some embodiments, the system can receive annotations from multiple annotators for the same image to account for the variation in people's perceptions of authenticity. In the detection aspect of the answer (fake/real), the system can adopt the majority choice and keep all of their provided explanations in the answer. In some embodiments, low-quality annotations (e.g., absence of answers to all questions for an image, conflicting annotations where annotators select both real and fake labels, annotations that are different from ground-truth detection labels) can be excluded from the training dataset.

Figure 3B:
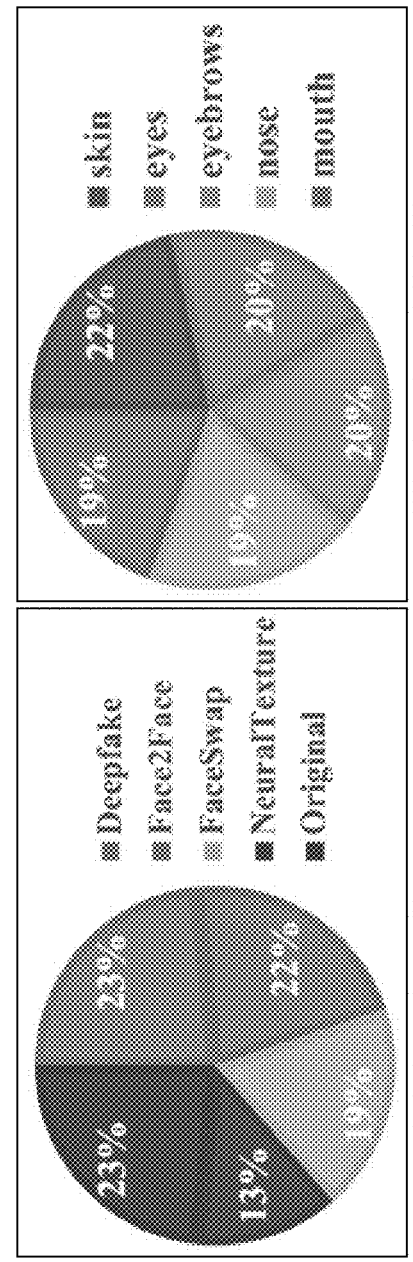
FIG. 3B illustrates statistics of an exemplary training dataset with respect of the distribution of manipulation method and facial components, in accordance with some embodiments.

FIG. 3B provides statistics of an exemplary training dataset with respect of the distribution of manipulation method and facial components. The dataset includes 2,968 images and 14,782 question-answer pairs. The distribution of manipulation methods is quite even while the number of the images manipulated by NeuralTexture technique are relatively smaller, indicating this technique relatively fools people more than other manipulation techniques. The distribution of different facial components in those questions shows an even distribution among different facial components.

EXPERIMENTS

Experimental Setup

DD-VQA Dataset. The proposed DD-VQA dataset includes 14,782 question-answer pairs. Following the FF++ train/test ids, the dataset was partitioned into training and testing sets, resulting in 13,559 question-answer pairs for training and 1,223 for testing. The training dataset contained 2,726 images, while the test dataset contained 242 images.

Dataset and Evaluation Metrics. The generated answer was evaluated from two aspects for the DD-VQA benchmark: the performance of deepfake detection and the quality of generated explanations. Accuracy, Precision, Recall and F1-Score metrics were used to assess detection performance. In the DD-VQA task, the AUC metric for detection was not used, given that the generated space was whole vocabulary text tokens of BERT rather than binary outputs. To assess the explanation quality, natural language generation metrics such as BLUE-4, CIDEr, ROUGE_L, METEOR, and SPICE were used. These scores evaluate the similarity between the generated and the annotated answer tokens.

Deepfake Detection Evaluation Metrics. The effectiveness of the learned multi-modal representations were also evaluated on the existing deepfake detection methods. The evaluation was based on commonly used metrics for deepfake detection, including Accuracy (Acc), Area Under the Receiver Operating Characteristic Curve (AUC), and Equal Error Rate (EER).

Implementation Details. The models were implemented in PyTorch. BLIP-base weights were used as the initial pre-training weights and the image transformer was ViT-B/16. When fine-tuning BLIP on the DD-VQA dataset, 300 epochs were conducted using 3 NVIDIA RTX GPUs (72 hours), with a batch size of 8 and a learning rate of 2e-5. AdamW was used as the optimizer with a weight decay of 0.05. During inference, the max generated token was set at 50.

Results on DD-VQA

BLIP was fine-tuned on the DD-VQA dataset and results were provide for both deepfake detection and the corresponding explanations. The model effectively captured the answer templates of "The X looks real fake. The person's X looks Y". Additionally, there was an absence of cases where the detection results conflicted with their corresponding explanations. In such a case, the generated text was split into sentences and the tokens of "fake" or "real" were extracted in the first sentence to assess the deepfake detection performance. An ablation was conducted to assess the impact of the proposed contrastive losses on top of the baseline.

FIG. 6 shows experimental results after fine-tuning BLIP with the DD-VQA dataset. Both deepfake detection and answer generation performance are reported. The deepfake detection results in DD-VQA were the generated text token rather than a binary classification result, so an AUC metric is not provided. BLIP-T means BLIP+text contrastive loss. BLIP-I means BLIP+image contrastive loss. BLIP-TI means BLIP+text+image contrastive loss. The best results are in bold font and the second-best results are underlined. Specifically, row #1 shows the results after fine-tuning BLIP with the DD-VQA dataset. On top of it, text contrastive loss was added, as shown in row #2, and both deepfake detection performance and answer generation quality improved. In row #3, results obtained by training the model with LM and image contrastive loss are presented. The results show that image contrastive loss is more effective than text contrastive loss. The best result in row #4 was achieved by training the model with all losses, resulting in an improvement of nearly 3% in F1 and 6% in accuracy over the BLIP baseline (row #1). This result indicates that the designed contrastive losses help the model distinguish real or fake features more effectively.

Results on Deepfake Detection Models

The learned multi-modal representation was integrated into the deepfake detection models. The effectiveness of the method was evaluated on two deepfake detection models: XceptionNet and RECCE. Both intra-testing and cross-testing were conducted. Specifically, the model was trained on the challenging dataset of c40, a low-quality setting of FF++. In the cross-testing, the model's performance on Celeb-DF and Wilddeepfake datasets was assessed.

FIG. 7 shows experimental results on multi-modal enhanced deepfake detection. BLIP (init) is BLIP pre-trained weights without fine-tuning on the DD-VQA dataset. BLIP-TI is trained for the DD-VQA task, enhancing the deepfake detector for its detection performance in both intra- and inter-testing scenarios. Row #1 to row #3 are the current SOTA deepfake detection approaches. The improved results in row #5 and row #8 indicate that the learned multi-modal representations helped improve the detection performance of both XceptionNet and RECCE in both intra-testing and cross-testing across various evaluation metrics. As shown in row #7, an additional experiment was conducted for the RECCE, fine-tuning the model with BLIP initial pre-trained weights instead of BLIP weights training using the DD-VQA dataset. It revealed that utilizing BLIP initial weights already contributed to improving the generalization ability, as evidenced by the improved results in cross-testing. This result highlighted that representations learned from text modality helped the deepfake detection. Moreover, fine-tuning BLIP with the DD-VQA dataset (BLIP-TI) further improved another 2% in both intra-testing and cross-testing (row #8). This suggests that the vision representation obtained through the DD-VQA task, which incorporates textual explanations regarding the image's authenticity based on common sense knowledge, proves beneficial for deepfake detection.

Ablation Study

Does explanation help in deepfake detection? An experiment was conducted to train BLIP on the DD-VQA dataset, comparing the model's performance with and without corresponding explanations. In the cases without explanations, the answer template for each question was only "The X looks real/fake." FIG. 8A shows the results of BLIP trained on the data with or without explanations. Det. means Detection and exp. means explanations. The results in FIG. 8A indicate that the detection performance is higher when explanations are included, demonstrating that the rich common-sense knowledge in the designed explanations is beneficial to deepfake detection. Cross-testing of the model was also performed on SeqDeepfake dataset, and the results showed a consistent trend, indicating explanations also helped generalization ability.

Detection performance on fine-grained questions. FIG. 9 shows deepfake detection performance on fine-grained questions. In FIG. 9, the model's performance across different fine-grained questions was analyzed, and the results indicated that the model consistently achieved satisfactory detection results for all specific questions. It was hypothesized that the model's higher performance on skin-related questions could be attributed to the relatively higher number of question-answer pairs related to skin in the dataset, as shown in FIG. 5B.

Comparison with ViT-based deepfake detection models. As the model is a multi-modal Transformer, it was compared with pure ViT Transformer-based deepfake detection models to assess whether adding additional textual modality contributed to performance improvement. It was compared against Efficient ViT and Convolutional Cross ViT. Efficient ViT combines a ViT with a convolutional EfficientNet BO as the feature extractor. Convolutional Cross ViT builds upon both the Efficient ViT and the multi-scale Transformer and enables the utilization of larger patches to achieve a broader receptive field. Although both Efficient ViT and Convolutional Cross VIT use video deepfake datasets (FF++ and DFDC), they extract frames from videos and use images for model training. Both the Efficient ViT and Convolutional Cross ViT trained models were evaluated with images in the DD-VQA dataset and compared with the model's answers to general questions of assessing the authenticity of the entire image. FIG. 8B shows a comparison with ViT-based Deepfake Detection Models. While Convolutional Cross ViT can perform much better on Efficient ViT, both results were still significantly below the model, even though all have been trained on the FF++ dataset.

Qualitative Study

Figure 10:
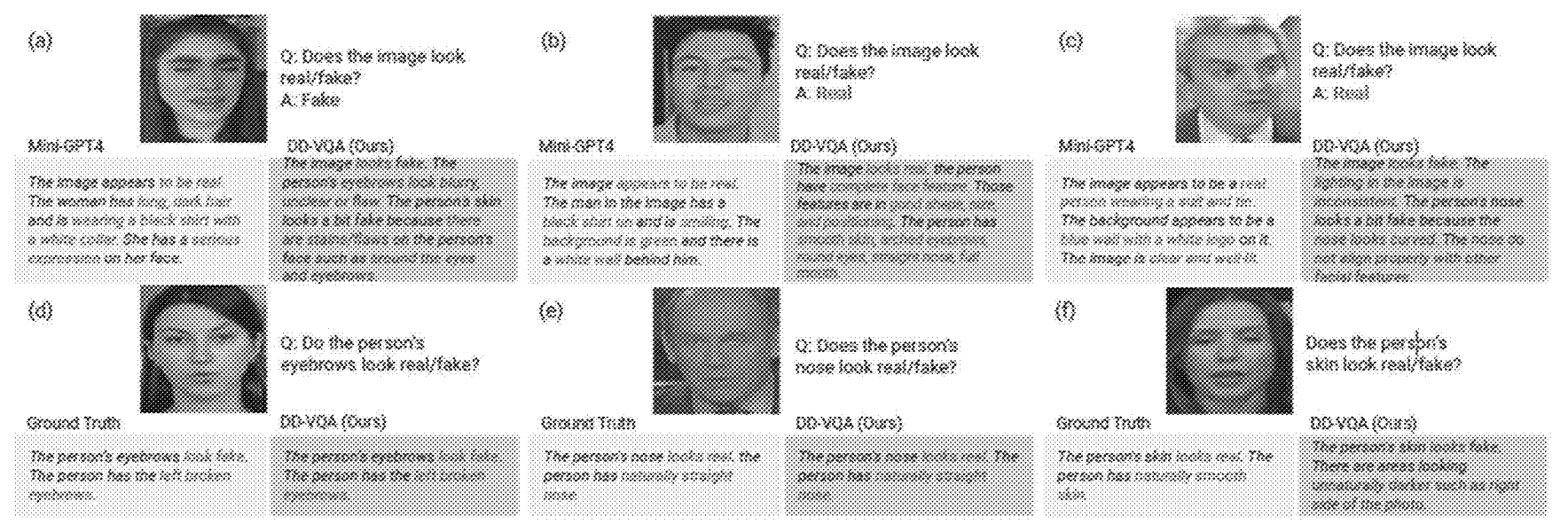

Qualitative Examples. Qualitative examples are provided in FIG. 10. Answers generated by Mini-GPT4, one of the powerful VL pre-trained models, were compared with answers from the model for the same question and image. Mini-GPT4 tended to perceive every image as real, offering detailed descriptions of human facial components, clothing, and the background. In contrast, the DD-VQA excelled at providing better detection results and accurately explaining the reasons behind the authenticity or fakeness of the image.

Figure 11A:
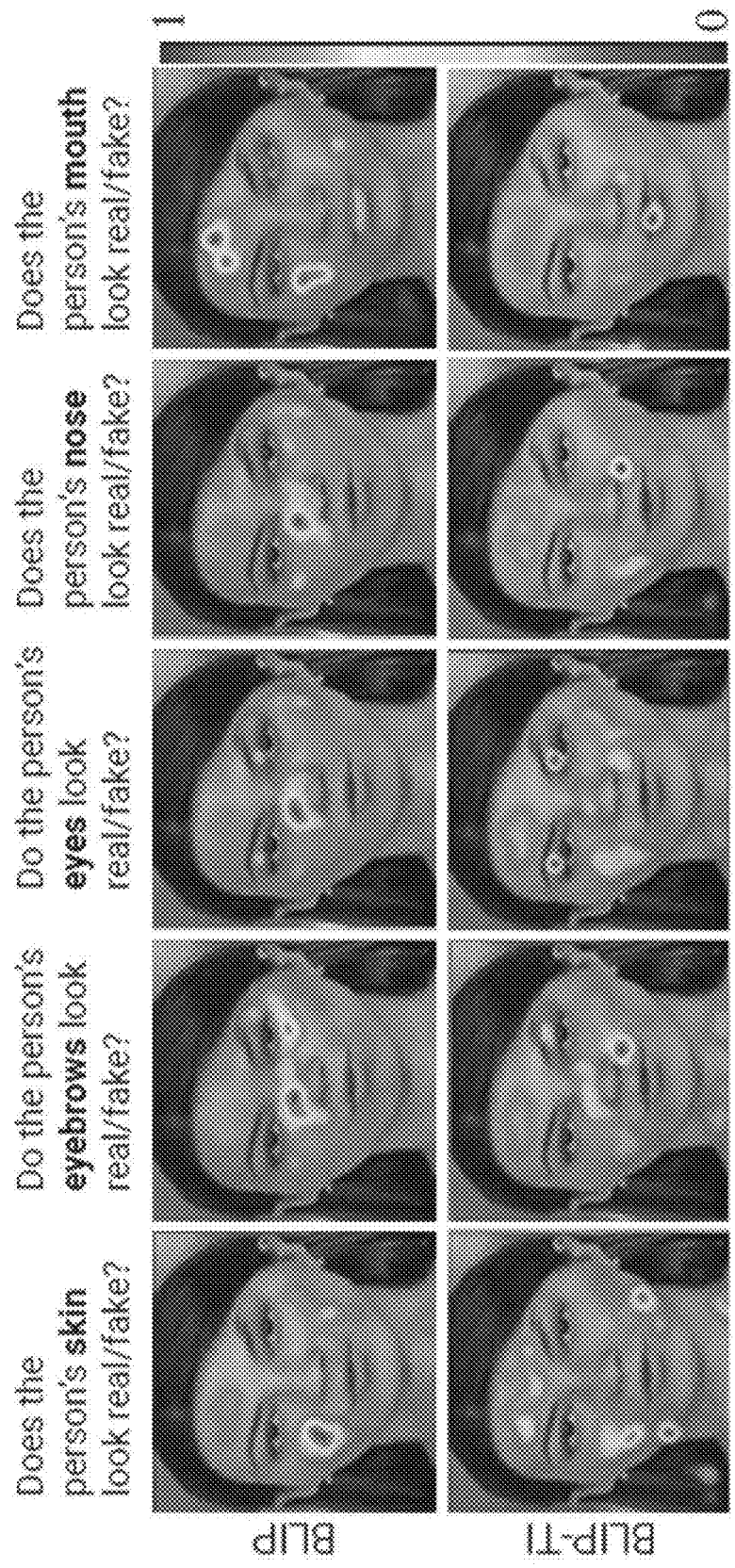
FIG. 11A illustrates an example to visualize the attention heatmap of the last cross-attention layer in the image-grounded encoder, in accordance with some embodiments.

Heatmap Visualization. FIG. 11A illustrates an example to visualize the attention heatmap of the last cross-attention layer in the image-grounded encoder. This visualization aimed to assess the model's ability to identify specific regions given the fine-grained questions. A comparison between the BLIP baseline and BLIP-TI was conducted. The results showed that BLIP alone was already capable of roughly identifying the corresponding region, while the incorporation of the contrastive losses enhanced the accuracy of localization, such as "eyes" and "mouth" in the example.

Figure 11B:
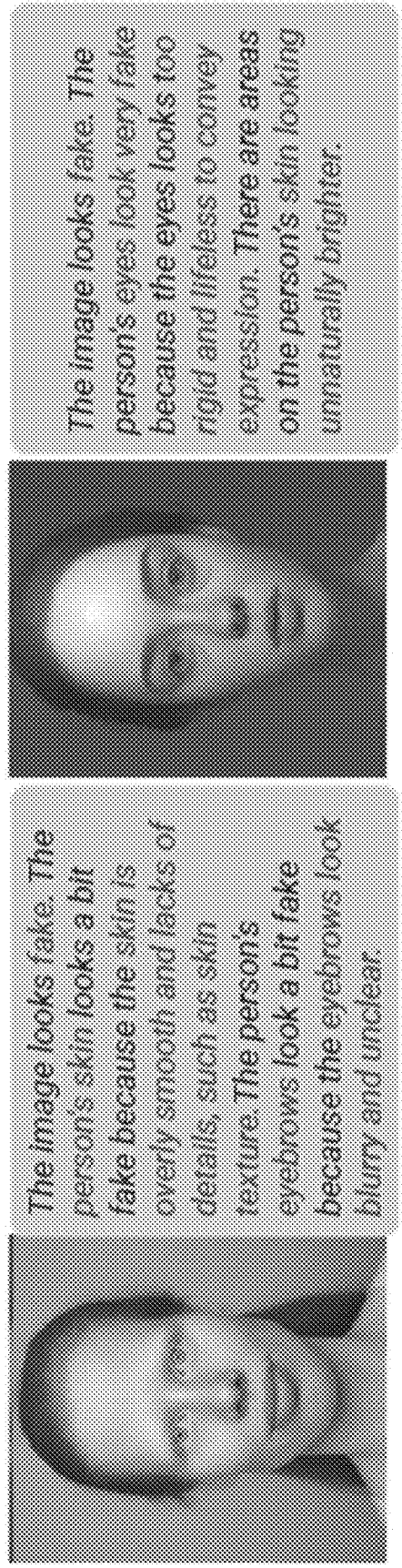
FIG. 11B illustrates exemplary images and answers, in accordance with some embodiments.
Figure 12A:
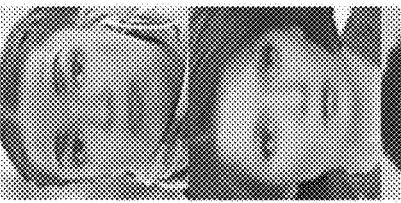
Figure 12B:
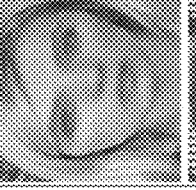

Midjourney Evaluation. The images in the DD-VQA dataset were generated from CNN-based models. To evaluate the model's generalization ability to other manipulated methods, its performance was assessed on images generated from diffusion-based models. Images were of human faces were generated from Midjourney (https://www.midjourney.com/) using text prompts of "a realistic face image of a person/celebrity" and then the model's deepfake detection performance was evaluated on those images. Finally, 50 images were collected, and the model successfully recognized 35 as fake. From those examples, the most fake reasons were "skin texture is overly smooth" and "eyes are too rigid." Examples are provided in FIG. 11B.

DD-VQA Dataset Annotations

Annotation Tools. Annotations for DD-VQA were collected entirely by crowd workers from Amazon Mechanical Turk (AMT) (https://www.mturk.com/). The dataset was collected over the course of 3 months and 3 iterations of updating annotation schemes. Approximate 9000 Human Intelligence Tasks (HITs) were launched on AMT, where each HIT involved 3-6 questions, answers, and the corresponding images. Each HIT was designed such that workers manage to earn anywhere between $6-$8 per hour, which followed ethical research standards on AMT.

Fakeness Annotations. FIGS. 12A-F present examples of fine-grained fake facial features and the corresponding descriptions in the dataset. The annotators were provided with fine-grained feature options and use templates to comprise the description with the model's templates. Some fakenesses required the annotators to provide the corresponding area, for example, "left or right eyebrows." Also, for the question of which area looks unnaturally brighter/darker, the answers needed to include the corresponding facial areas, such as "left/right cheeks", "beside the left/right eyes", "around nose", etc.

Figure 13:
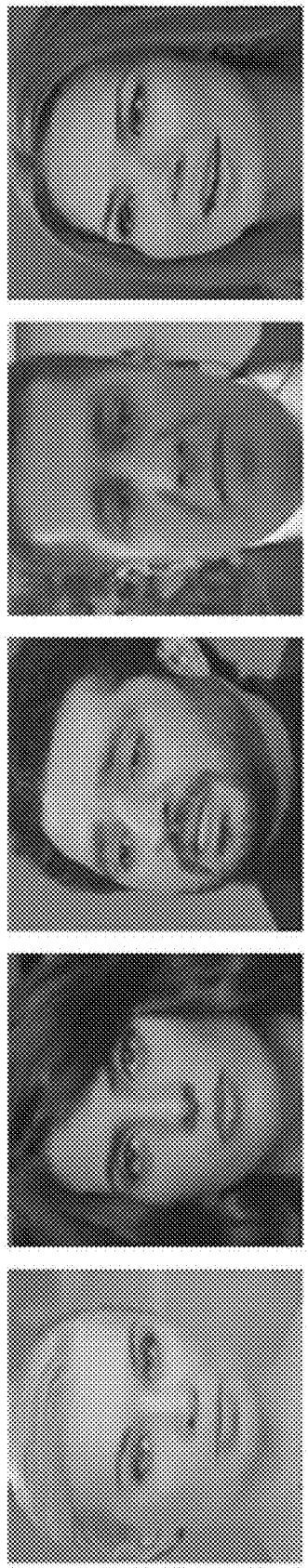
FIG. 13 illustrates examples where at least two annotators mistakenly perceived manipulated images as real, in accordance with some embodiments.

Challenging Annotation Cases. FIG. 13 provides examples where at least two annotators mistakenly perceived manipulated images as real. Such cases were excluded when annotators provide inaccurate labels, as effective deception of humans requires the human face in the image to adhere to common-sense knowledge.

Uncertainty of Fakeness. There were cases where annotators expressed uncertainty regarding the image's authenticity. To capture this ambiguity, annotators were offered a fakeness rating scale ranging from 0 to 5, where 0 and 1 indicated authenticity, 2 and 3 meant a slight degree of fakeness, and 4 and 5 represented a high degree of fakeness. The corresponding descriptions were "real", "a bit fake", and "very fake". Annotating the uncertainty of fakeness helped the model simulate human perception of fakeness, thereby enhancing its ability to generate explanations that align more accurately with human judgment.

General Questions assessed the overall authenticity of an image. The format of the general question was "Does the person in the image look fake?" The answers to this question covered the general reasons for authenticity or fakeness. Specifically, the general fakeness factors included "obvious manipulated region", "incomplete face feature", "unrealistic texture or lighting", etc. Conversely, the general reasons for authenticity involved "complete face features", "face features in good shape, size, and positioning", "natural expression", etc.

Fine-Grained Facial Feature Questions assessed the authenticity of individual facial features. There were instances where specific facial components may have still exhibited authenticity despite the overall image appearing fake. The detailed facial features included eyebrows, skin, eyes, nose, and mouth. The format of the fine-grained feature question was "Do the person's X look real fake?", and X is any facial component. The corresponding examples are shown in FIG. 13.

Eyebrows. Humans commonly have a pair of eyebrows with a symmetrical shape, smooth hair, and a dark color. The presence of overlapping, broken and blurred eyebrows can indicate manipulated images. Skin. There is no universally "perfect" type of skin; however, generally, common skin should exhibit clarity, an even skin tone, and a smooth texture, especially at lower resolutions. Also, the presence of boundaries, discolored patches, or drastically inconsistent skin color on the face are not characteristic of a real person's face. Eyes. Common eyes include the characteristics of symmetry, clarity, expressiveness, an appropriate size, etc. The blurred and asymmetric eyes in a manipulated image can indicate fakeness. Nose. An ideal nose should be appropriately positioned, with clear and proportionate nostrils in terms of shape and size. However, the unnaturally curved nose or nose without fine lines are obvious fake signs. Mouth. The mouth in the annotation scheme refers to mouth areas, including lips, teeth and chin. The appearance of inappropriate size and color of these areas could be used to indicate fakeness.

DD-VQA Enhanced Deepfake Detection

The proposed DD-VQA generated multi-modal representations that can serve as a model-agnostic enhancement for general binary deepfake detectors. RECCE was used as an example to illustrate this approach. RECCE proposed a forgery detection framework that leveraged the common compact representations of genuine faces based on reconstruction classification learning. Specifically, the images were fed into an encoder-decoder reconstruction network for representation learning. The encoder's output, denoted as $F_1$, underwent a multi-scale graph reasoning module to enhance better representation, denoted as $F_2$, which was subsequently combined with $F_1$. In summary, the vision representation of deepfake detection was $F'=F_1+F_2$. Based on this, the DD-VQA enhanced multi-modal representation F obtained from the VL model trained using the DD-VQA dataset was incorporated. First a few CNN layers were utilized to transform F into the same shape as F'. The final enhanced representation $F^{en.}$ was obtained with $F^{en.}=F'+\theta(F)$, where $\theta(*)$ represented the necessary tensor shape transformations for fusing F and F'.

Experiment Setup

Metrics. Mainly image-caption-based metrics were used to evaluate the quality of the generated text, as follows. BLEU-4 was used to evaluate the precision of the match between the generated text and reference text based on 4-grams. CIDEr measured the consensus between the generated text and the referenced text, considering both word and grammar similarity and the alignment in terms of meaning and content. Rouge_L evaluated the Longest Common Subsequence (LCS) of words between the generated text and the referenced text. Using LCS did not require consecutive matches but in-sequence matches reflecting sentence-level word order. METEOR considered precision, recall, stemming, synonymy, and word order. It employed a unigram-based matching approach but extended it with additional semantic features. SPICE evaluated how well a generated text can capture the specific entities present in the image, emphasizing precision, recall, and diversity.

ViT-based deepfake detection models. Efficient ViT combined a ViT with a convolutional EfficientNet BO as the feature extractor. Convolutional Cross ViT built upon both the Efficient ViT and the multi-scale Transformer, and enabled the utilization of larger patches to achieve a broader receptive field. Although both Efficient ViT and Convolutional Cross ViT used video deepfake datasets (FF++ and DFDC), they extracted frames from videos and use images for model training.

Qualitative Study

Figure 14:
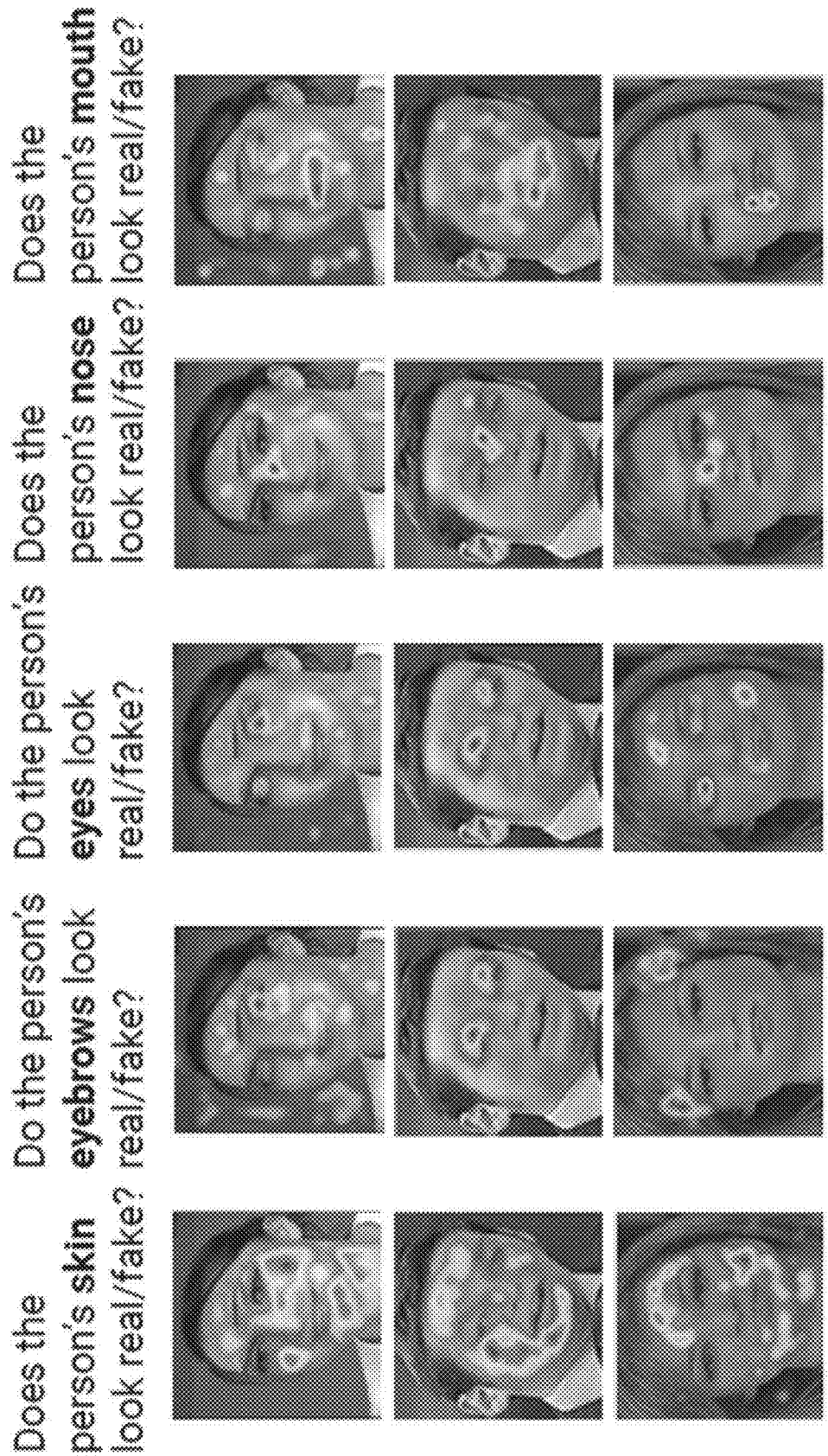
FIG. 14 illustrates exemplary visualizations generated by the best model BLIP-TI, in accordance with some embodiments.

Visualization. Additional visualization examples generated by the best model BLIP-TI are presented in FIG. 14. The model was trained with both language modeling loss and the designed contrastive losses. These examples demonstrate that the highlighted attention areas predominantly aligned with facial components mentioned in the question. GradCam visualization technique was employed to show the alignments between textual tokens and the highlight area in the image.

Figure 15:
FIG. 15 illustrates additional qualitative examples.

Qualitative Examples. Additional qualitative examples are provided in FIG. 15. The testing was extended beyond the FF++ dataset. The model was evaluated on diverse images, including cartoon images, Photoshop images, and images generated using a diffusion model. These examples show that the model can capture common-sense knowledge of human facial feature well. For instance, for the cartoon image of FIG. 15 item (c), the model can capture the patter of "over large eyes." Also, a real image was manipulated to put another pair of eyebrows on the top of the original eyebrows, as shown in FIG. 15 item (f), and the model could still capture the fakeness of "overlapped eyebrows." For images from Midjourney (FIG. 15 item (g) and FIG. 15 item (h)), the model can capture the fakeness of "rigid eyes and mouth."

DD-VQA User Interface. The User interface is provided in FIG. 1B. Users can input questions and the model generates the corresponding answers.

The operations described above are optionally implemented by components depicted in FIG. 16. It would be clear to a person having ordinary skill in the art how other processes are implemented based on the components depicted in FIG. 16.

FIG. 16 illustrates an example of a computing device in accordance with one embodiment. Device 1600 can be a host computer connected to a network. Device 1600 can be a client computer or a server. As shown in FIG. 16, device 1600 can be any suitable type of microprocessor-based device, such as a personal computer, workstation, server or handheld computing device (portable electronic device) such as a phone or tablet. The device can include, for example, one or more of processor 1610, input device 1620, output device 1630, storage 1640, and communication device 1660. Input device 1620 and output device 1630 can generally correspond to those described above, and can either be connectable or integrated with the computer.

Input device 1620 can be any suitable device that provides input, such as a touch screen, keyboard or keypad, mouse, or voice-recognition device. Output device 1630 can be any suitable device that provides output, such as a touch screen, haptics device, or speaker.

Storage 1640 can be any suitable device that provides storage, such as an electrical, magnetic or optical memory including a RAM, cache, hard drive, or removable storage disk. Communication device 1660 can include any suitable device capable of transmitting and receiving signals over a network, such as a network interface chip or device. The components of the computer can be connected in any suitable manner, such as via a physical bus or wirelessly.

Software 1650, which can be stored in storage 1640 and executed by processor 1610, can include, for example, the programming that embodies the functionality of the present disclosure (e.g., as embodied in the devices as described above).

Software 1650 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1640, that can contain or store programming for use by or in connection with an instruction execution system, apparatus, or device.

Software 1650 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 1600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1600 can implement any operating system suitable for operating on the network. Software 1650 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific examples or aspects. However, the illustrative discussions above are not intended to be exhaustive or to limit the invention to the precise forms disclosed. For the purpose of clarity and a concise description, features are described herein as part of the same or separate variations; however, it will be appreciated that the scope of the disclosure includes variations having combinations of all or some of the features described. Many modifications and variations are possible in view of the above teachings. The variations were chosen and described in order to best explain the principles of the techniques and their practical applications. Others skilled in the art are thereby enabled to best utilize the techniques and various variations with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

What is claimed is:

1. A method for detecting deepfake images and providing customized analysis, comprising:
   receiving a user inquiry regarding an image, the user inquiry comprising a question about whether one or more visual features in the image are fake;
   inputting a text string associated with the user inquiry and the image into a deepfake detection model, wherein the deepfake detection model comprises:
      an image encoder for generating one or more representations of the image;
      a text encoder for generating one or more representations of the text string; and
      one or more layers for generating a textual analysis based on the one or more representations of the image and the one or more representations of the text string; and
   outputting the textual analysis, wherein the textual analysis includes a classification result of whether the image is fake and further includes a classification result of whether the one or more visual features in the image are fake and one or more attributes of the one or more visual features that contribute to the classification result.

2. The method of claim 1, wherein the visual features include facial features.

3. The method of claim 2, wherein the facial features include eyebrows, skin, eyes, nose, mouth, teeth, chin, hair, accessories, shadow, or a combination thereof.

4. The method of claim 1, wherein the user inquiry further comprises a question about whether the image is fake.

5. The method of claim 1, further comprising: displaying a chatbot user interface for receiving the user inquiry related to the image.

6. The method of claim 1, wherein the one or more representations of the image comprise a plurality of image embeddings and wherein the one or more representations of the text string comprise a plurality of textual embeddings.

7. The method of claim 6, wherein the one or more layers comprises a set of layers for generating a plurality of answer embeddings based on the plurality of image embeddings and the plurality of textual embeddings.

8. The method of claim 7, wherein the set of layers of the deepfake detection model further comprises: a plurality of cross attention layers.

9. The method of claim 8, further comprising generating, using the plurality of cross-attention layers, a plurality of encoded image embeddings and a plurality of encoded text embeddings based on the plurality of image embeddings and the plurality of textual embeddings.

10. The method of claim 9, wherein the set of layers of the deepfake detection model further comprises: a text decoder.

11. The method of claim 10, further comprising generating, using the text decoder, a plurality of decoded text embeddings.

12. The method of claim 11, wherein the plurality of answer embeddings comprises the plurality of decoded text embeddings.

13. The method of claim 10, wherein the text decoder is trained via text contrastive learning.

14. The method of claim 1, wherein the image encoder is trained via image contrastive learning.

15. The method of claim 1, wherein the deepfake detection model is trained using a training dataset comprising a training image, a corresponding textual inquiry regarding the training image, a classification result of whether the training image is fake, and a corresponding textual response to the textual inquiry.

16. The method of claim 15, wherein the corresponding textual response to the textual inquiry is generated by one or more selections of a plurality of predefined descriptors by a human annotator.

17. The method of claim 15, wherein the deepfake detection model is trained at least partially by: inputting the corresponding textual response to the textual inquiry into a plurality of causal self-attention layers.

18. The method of claim 1, wherein the deepfake detection model comprises a BLIP model.

19. A system for detecting deepfake images and providing customized analysis, comprising: one or more processors; one or more memories; and one or more programs, wherein the one or more programs are stored in the one or more memories and configured to be executed by the one or more processors, the one or more programs including instructions for:
   receiving a user inquiry regarding an image, the user inquiry comprising a question about whether one or more visual features in the image are fake;
   inputting a text string associated with the user inquiry and the image into a deepfake detection model, wherein the deepfake detection model comprises:
      an image encoder for generating one or more representations of the image;
      a text encoder for generating one or more representations of the text string; and
      one or more layers for generating a textual analysis based on the one or more representations of the image and the one or more representations of the text string; and
   outputting the textual analysis, wherein the textual analysis includes a classification result of whether the image is fake and further includes a classification result of whether the one or more visual features in the image are fake and one or more attributes of the one or more visual features that contribute to the classification result.

20. A non-transitory computer-readable storage medium storing one or more programs for detecting deepfake images and providing customized analysis, the one or more programs comprising instructions, which when executed by one or more processors of an electronic device, cause the electronic device to perform:
   receive a user inquiry regarding an image, the user inquiry comprising a question about whether one or more visual features in the image are fake;
   input a text string associated with the user inquiry and the image into a deepfake detection model, wherein the deepfake detection model comprises:
      an image encoder for generating one or more representations of the image;
      a text encoder for generating one or more representations of the text string; and
      one or more layers for generating a textual analysis based on the one or more representations of the image and the one or more representations of the text string; and
   output the textual analysis, wherein the textual analysis includes a classification result of whether the image is fake and further includes a classification result of whether the one or more visual features in the image are fake and one or more attributes of the one or more visual features that contribute to the classification result.

21. The method of claim 1, wherein the textual analysis further comprises one or more attributes of one or more additional visual features, wherein the one or more additional features are different from the one or more visual features specified in the user inquiry.

* * * * *